US006799794B2

United States Patent
Mochidome et al.

(10) Patent No.: US 6,799,794 B2
(45) Date of Patent: Oct. 5, 2004

(54) BODY STRUCTURE

(75) Inventors: Hiroyuki Mochidome, Mihara (JP);
Yoshinori Mitsui, Mihara (JP);
Naofumi Nagaike, Kawasaki (JP);
Tatsuaki Hayashida, Kawasaki (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 31 days.

(21) Appl. No.: 10/088,514

(22) PCT Filed: Aug. 28, 2001

(86) PCT No.: PCT/JP01/07353
§ 371 (c)(1),
(2), (4) Date: Jul. 17, 2002

(87) PCT Pub. No.: WO02/18189
PCT Pub. Date: Mar. 7, 2002

(65) Prior Publication Data
US 2003/0075952 A1 Apr. 24, 2003

(30) Foreign Application Priority Data

Aug. 28, 2000 (JP) .................................. 2000-256955
Aug. 28, 2000 (JP) .................................. 2000-256956
Aug. 28, 2000 (JP) .................................. 2000-256957
Aug. 28, 2000 (JP) .................................. 2000-256958

(51) Int. Cl.⁷ .............................................. B60R 19/24
(52) U.S. Cl. .......................... 296/187.03; 296/193.09; 296/203.02; 293/143
(58) Field of Search ................................ 293/102, 123, 293/132, 133, 142, 143, 144; 296/187.03, 187.09, 187.1, 187.11, 193.04, 193.09, 203.01, 203.02, 203.04

(56) References Cited

U.S. PATENT DOCUMENTS 2,239,089 A * 4/1941 Fageol .................. 296/203.01
3,715,137 A * 2/1973 Sandberg .................... 293/133

(List continued on next page.)

FOREIGN PATENT DOCUMENTS

| DE | 42 42 303 A1 | * 6/1994 | ............... 293/102 |
| JP | 7-186951 | 7/1995 | |
| JP | 10-226334 | 8/1998 | |
| JP | 11-59297 | 3/1999 | |
| JP | 2000-506473 | 5/2000 | |

OTHER PUBLICATIONS

Microfilm of the specification and drawings annexed to the request of Japanese Utility Model Application No. 38054/1973 (Laid–open No. 138504/1974) (Nipon Sharyo Seizo Kaisha, Ltd.), Nov. 28, 1974.

Microfilm of the specification and drawings annexed to the request of japanese Utility Model Application No. 3065/1977 (Laid–open No. 99707/1978) (Hitachi, Ltd.), Aug. 12, 1978.

International Search Report dated Nov. 1, 2001.

Primary Examiner—D. Glenn Dayoan
Assistant Examiner—Paul Chenevert
(74) Attorney, Agent, or Firm—Armstrong, Kratz, Quintos, Hanson & Brooks, LLP

(57) ABSTRACT

In a front gable portion (13) of a rubber-tired new traffic vehicle (11), an outer bumper (45) is fixed to the exterior of an inner bumper (32) constituting an underframe (33), front beams (47, 48) and side beams (49) are constructed between a roof frame (42) and the outer bumper (45), the front beams (47, 48) are inclined and curved in harmony with the streamlined design of the vehicle (11), and straight portions (47a, 48a) of predetermined lengths are formed in lower end portions of the front beams (47, 48) along a vertical direction.

19 Claims, 21 Drawing Sheets

U.S. PATENT DOCUMENTS

| | | | | |
|---|---|---|---|---|
| 4,190,276 A | * | 2/1980 | Hirano et al. | 293/133 |
| 4,702,515 A | * | 10/1987 | Kato et al. | 296/187.01 |
| 4,758,034 A | * | 7/1988 | Ghezzi et al. | 293/132 |
| 4,840,423 A | * | 6/1989 | Maekawa | 296/203.02 |
| 4,929,008 A | * | 5/1990 | Esfandiary | 293/108 |
| 5,462,325 A | * | 10/1995 | Masuda et al. | 293/102 |
| 5,579,699 A | * | 12/1996 | Dannawi et al. | 105/416 |
| 6,361,092 B1 | * | 3/2002 | Eagle et al. | 293/102 |
| 6,540,276 B2 | * | 4/2003 | Azuchi et al. | 293/102 |

* cited by examiner

F I G. 15
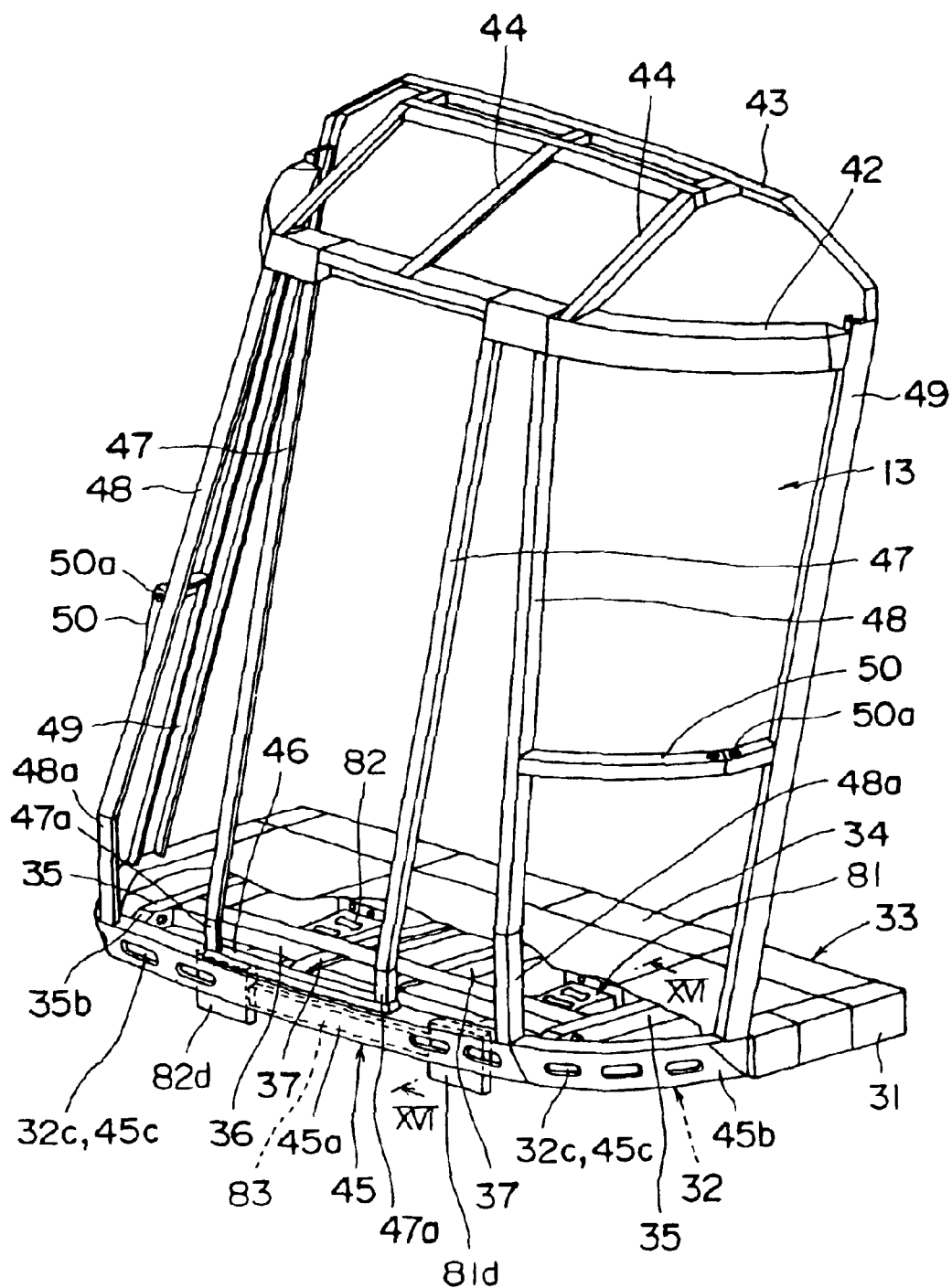

BODY STRUCTURE

TECHNICAL FIELD

This invention relates to a vehicle body structure which absorbs an impact force exerted when vehicles collide in driving directions, and which cushions the impact force imposed on a passenger compartment. The vehicle body structure is preferred for use in a vehicle having a passenger compartment, or an automobile having a driver seat.

BACKGROUND ART

Various track type medium duty traffic systems called new traffic systems are new technologies which generally combine railway technologies on, for example, electric motors, power collection, and vehicle bodies, with automobile technologies concerned with driving of rubber wheels, and which further incorporate computerized control. A technique, called a rubber-tired new traffic vehicle, uses steerable rubber running wheels mounted on a box-shaped vehicle body, makes these running wheels drivable, by an electric motor, and involves dedicated tracks and electric-car lines. Thus, the vehicle can travel along the tracks by the running wheels rotationally driven by the electric motor, while the electric motor is receiving supply of an electric power from power collectors in a travel zone.

An operation management system for the rubber-tired new traffic vehicles links automatic vehicle driving equipment, signal protection devices, communication equipment, power equipment, and disaster protection management facilities to perform centralized management of vehicle schedule control, route control, display control, and operation control, thereby operating vehicles smoothly and safely in an unmanned manner.

With the rubber-tired new traffic vehicle, when control instruments in the operation management system fail, various manual operations and manipulations by the driver are possible. In this case, the travel speed is limited to a low speed. In the case of such a manual vehicle operation or manipulation by the driver, a collision accident to vehicles may occur owing to an erroneous operation or the like. Thus, crush zones for cushioning shock in the vehicle collision are provided at a front end portion and a rear end portion of the vehicle.

FIG. 20 schematically shows the skeletal structure of a vehicle front end portion representing a conventional vehicle body structure. As shown in FIG. 20, an underframe 102 is formed as a continuation of a vehicle body floor (passenger compartment) 101, and a bumper 103 of a U-shape in a plan view is fixed to a front portion of the underframe 102. On the other hand, a front end roof frame 105 of a U-shape in plan view is fixed as a continuation of a vehicle body roof 104, and the front end roof frame 105 and the bumper 103 are connected together by a plurality of front beams 106 and side beams 107. The front beams 106 and the side beams 107 are connected by connecting beams 108. In this manner, a front gable portion 109 is composed of the underframe 102, bumper 103, front end roof frame 105, and beams 106, 107 and 108. An outer wall 111 of FRP is attached to the outside of the structure thus formed from the skeleton.

Hence, when rubber-tired new traffic vehicles collide head-on, their front end portions contact, and then the respective members are buckled, whereby the front gable portion 109 is crushed, and a cushioning member 110 is also buckled. Thus, the front gable portion 109 and the cushioning member 110 absorb shock due to the collision, whereupon an impact force transmitted to the passenger compartment located behind the front gable portion 109 is relieved, so that deformation of the passenger compartment can be prevented.

The aforementioned vehicle running on the dedicated tracks is preferably streamlined in consideration of the vehicle body's design and air resistance, and the conventional vehicle body has an acute-angled front end portion. If the front end portion of the vehicle body is in an acute-angled shape, however, head-on collision of the vehicles results in one of the vehicles passing over the other vehicle, and the front gable portion 109 or cushioning member 110 is not properly crushed. Thus, the impact force at the time of collision cannot be absorbed by the front gable portion 109, and the impact force may be partly transferred to the passenger compartment to cause its deformation.

In this case, it is conceivable to mount a bumper protruding to the front of the vehicle body as in an automobile so that in the head-on collision of the vehicles, their vehicle bodies are not displaced, one on top of the other, but their front gable portions 109 are properly crushed. Mounting of a large bumper at the front end portion of the vehicle body leads to a change in the design of the vehicle, markedly deteriorating the appearance quality.

Moreover, since control instruments are installed in the aforementioned front gable portion 109, the cushioning member 110 for absorbing an impact force during collision has to be disposed below the underframe 102. Therefore, when a collision force is inputted to the front end portion of the vehicle, as shown in FIG. 21(a), the front beam 106 is crushed rearward, as shown in FIG. 21(b). Thus, the underframe 102 (the front and rear beams, floor board, etc.), to which a lower part of the front beam 106 has been firmly connected, is deformed in a downwardly bending manner. As a result, the downwardly bent, deformed underframe 102 presses the cushioning member 110 downward to bend it down. Consequently, the cushioning member 110 is further bent, without being buckled in response to an impact force subsequently inputted from the front end portion, and is no more capable of absorbing the impact force sufficiently.

In this case as well, the front end portion of the cushioning member 110 may be configured to protrude forwardly of the vehicle body in order to absorb an impact force, which occurs at head-on collision of vehicles, reliably by the cushioning member 110 by directly inputting the impact force to the front end portion of the cushioning member 110 at the collision. Forward extension of the cushioning member 110, however, leads to a change in the design of the vehicle, markedly deteriorating the appearance quality.

Furthermore, the impact force in the collision is absorbed by the crushing of the constituent members of the front gable portion 109 and the buckling of the cushioning member 110. If the vehicles collide straightly, the impact force in the collision can be absorbed reliably. However, if collision occurs when the vehicle runs on a curve, the impact force cannot be absorbed reliably.

In detail, the cushioning member 110 is designed to absorb the impact force reliably, for example, by having holes in a circumferential surface of a tubular body and buckling in a longitudinal direction at the time of collision. When a collision occurs while the vehicle is running on a curve, an impact force acts on the front end portion of the cushioning member 110 from an oblique direction. As a result, the cushioning member 110 is bent and does not buckle in the longitudinal direction. Hence, the function of the cushioning member 110 may fail to be properly performed, and the impact force during the collision cannot be sufficiently absorbed to cause deformation of the passenger compartment.

The present invention is intended to solve the above-described problems. Its object is to provide a vehicle body structure for achieving increased safety by reliably absorbing shock, which occurs when vehicles collide, without aggravating appearance quality or air resistance.

DISCLOSURE OF THE INVENTION

The vehicle body structure of the present invention for attaining the above object is characterized in that a crush zone for absorbing an impact force in a collision is provided on a front head side of a vehicle relative to a passenger compartment, and a straight portion extending along a vertical direction is formed in a front portion of a vertical beam as a constituent member constituting the crush zone.

Thus, the straight portion can be easily formed without an increase in the number of components. Even if there is a vertical displacement in a collision of vehicles, the straight portions collide, and the resulting impact force is transmitted to the crush zone. One of the vehicles does not run onto the other vehicle, but the crush zone is crushed, and can reliably absorb the impact force due to the collision. In this case, a shock absorbing member, such as a bumper, need not be provided in a front portion of the vehicle. Nor is appearance quality or air resistance aggravated. The safety of the vehicle can be increased without fail.

The vehicle body structure of the present invention is also characterized in that the length of the straight portion is set according to the amount of vertical displacement during travel of the vehicle.

Thus, the length of the straight portion can be minimized, and the degree of freedom of vehicle design can be heightened. Consequently, appearance quality can be improved, and air resistance can be decreased to improve fuel economy.

The vehicle body structure of the present invention is also characterized in that the vertical beam connects a roof frame and an underframe, and an inclined portion inclined forwardly is formed in an upper portion of the vertical beam, while the straight portion is formed in a lower portion of the vertical beam.

Thus, an appropriate straight portion is formed, whereby the safety of the vehicle can be increased, without aggravation of the appearance quality or air resistance of the vehicle.

The vehicle body structure of the present invention is also characterized in that a plurality of the vertical beams are provided in the width direction of the vehicle.

Thus, a plurality of straight portions can be provided in the width direction of the vehicle. The straight portions reliably collide with each other, and the resulting impact force can be absorbed by the crush zone without fail.

The vehicle body structure of the present invention is also characterized in that the straight portion is located at the most forward position.

Thus, the straight portions reliably collide with each other, and the resulting impact force is transmitted to the crush zone, and can be absorbed thereby without fail.

The vehicle body structure of the present invention is also characterized in that the vertical beam connects a roof frame and an underframe, a bumper is connected to the underframe, and the bumper has a central portion protruding forwardly of the vehicle and has buckling strength changing means provided in opposite side portions.

Thus, in a collision of the vehicles, the bumper is longitudinally buckled into deformation by the buckling strength changing means, whereby an impact force in the collision can be easily absorbed to increase the safety of the vehicle.

The vehicle body structure of the present invention is also characterized in that the opposite side portions of the bumper are weakened relative to the central portion by the buckling strength changing means.

Thus, in a collision of the vehicles, the central portion of the bumper moves rearward, and the opposite side portions buckle, so that the impact force can be reliably absorbed to increase the safety of the vehicle.

The vehicle body structure of the present invention is also characterized in that the buckling strength changing means is holes formed in the bumper.

Thus, an impact force in a collision can be absorbed by a simple and inexpensive structure.

The vehicle body structure of the present invention is also characterized in that a reinforcing member is provided in the central portion of the bumper.

Thus, when the vehicles collide, the central portion of the bumper reinforced with the reinforcing member recedes without buckling, while the opposite side portions of the bumper buckle, so that the impact force can be absorbed reliably.

The vehicle body structure of the present invention is also characterized in that a cushioning member located behind the constituent member and adapted to buckle by the impact force, thereby relieving the impact force, is provided on one side in the vertical direction of the straight portion, and an auxiliary member is provided for bending the constituent member away from the cushioning member when the impact force is inputted.

Thus, when an impact force in a collision of the vehicles is inputted to the constituent member of the crush zone, the constituent member is bent by the auxiliary member away from the cushioning member. The constituent member does not bend the cushioning member from above, and does not impair the essential function of the cushioning member, the function of absorbing the impact force by its buckling in the longitudinal direction. Since the shock of collision of the vehicles is reliably absorbed, safety can be increased.

The vehicle body structure of the present invention is also characterized in that the constituent member includes a bumper connected to a lower end portion of the vertical beam, and a beam member constructed between the bumper and a vehicle body, and a front portion of the beam member is bent toward the cushioning member to constitute the auxiliary member.

Thus, the auxiliary member can be constituted at a low cost and with ease, without impairment of the function of the beam member constituting the crush zone. At the time of a collision, the beam member is deformed toward the cushioning member, and a loss of the function of the cushioning member due to deformation can be prevented.

The vehicle body structure of the present invention is also characterized in that the constituent member includes a bumper connected to a lower end portion of the vertical beam, a reinforcing member fixed behind the bumper, and a beam member constructed between the bumper and the reinforcing member, and a front portion of the beam member is curved toward the cushioning member to constitute the auxiliary member.

Thus, the auxiliary member can be constituted at a low cost and with ease, without impairment of the function of the beam member constituting the crush zone. At the time of a collision, the beam member is deformed toward the cushioning member, and a loss of the function of the cushioning member due to deformation can be prevented.

The vehicle body structure of the present invention is also characterized in that the constituent member is a bumper connected to a lower end portion of the vertical beam, continued from the straight portion, and inclined rearward, and the bumper covers at least part of the cushioning member.

Thus, the cushioning member is easily disposed without deterioration of appearance quality. Shock in a collision can be reliably absorbed by deformation of the cushioning member.

The vehicle body structure of the present invention is also characterized in that a cushioning member located behind the constituent member and adapted to buckle by the impact force, thereby relieving the impact force, is provided on one side in a vertical direction of the straight portion, and a protrusion for secondary collision, which is exposed forward, is provided in a front end portion of the cushioning member.

Thus, when an impact force in a collision of vehicles is inputted to the crush zone, the constituent member crushed by the impact force presses the cushioning member, trying to deform it into inclination. Before then, however, the protrusions for secondary collision collide with each other. Thus, the inclination of the crash portions is prevented, and the cushioning members are properly buckled in the longitudinal direction by the impact force inputted from ahead, being capable of absorbing the collision force reliably.

The vehicle body structure of the present invention is also characterized in that a plurality of cushioning members for relieving the impact force by being buckled by the impact force are arranged side by side on right and left sides of the vehicle behind the straight portion, and front end portions of the cushioning members are connected by a connecting member.

Thus, the flexural rigidity of each cushioning member is increased. Even when the vehicles collide obliquely and the resulting force acts on the cushioning member obliquely, the cushioning member is not bent, but is buckled longitudinally, becoming capable of absorbing the impact force reliably. The safety in collision can be increased.

The vehicle body structure of the present invention is also characterized in that the cushioning member includes a buckling portion extending forward from a base end portion attached to a vehicle body, and a crash portion attached to a front end portion of the buckling portion, reinforcing means is provided in the mounting area of the vehicle body and the buckling portion, and a reinforcing member is provided in the connecting area of the buckling portion and the crash portion.

Thus, the surface rigidity at the connecting areas of the vehicle body, the buckling portion, and the crash portion is increased. Even when an impact force in a collision acts on the cushioning member obliquely, the cushioning member is not bent, but is buckled longitudinally and can absorb the impact force reliably.

The vehicle body structure of the present invention is also characterized in that a cushioning member for relieving the impact force by being buckled by the impact force is provided behind the straight portion, and a vertical restraining member for inhibiting vertical displacement, relative to a member to be collided with, in the collision is provided in a front end portion of the cushioning member.

Thus, when the front end portion of the cushioning member is struck in a collision of the vehicles, vertical displacement at the crash portion is inhibited by the vertical restraining member. The crash member is properly buckled in the longitudinal direction, and can absorb the impact force reliably. As noted here, shock in the collision can be reliably absorbed to increase safety, without aggravating appearance quality or air resistance.

The vehicle body structure of the present invention is also characterized in that the vertical restraining member is constituted by fixing a plurality of horizontal engagement plates at predetermined intervals in a hollow box attached to the front end portion of the cushioning member.

Thus, when the front end portions of the cushioning members collide with each other, the engagement plates deform the front surfaces of the boxes, and engage each other, thereby inhibiting vertical displacement. The crash members are properly buckled in the longitudinal direction, and thus can absorb the impact force reliably. Furthermore, the vertical restraining member is composed of the plural engagement plates, so that the structure can be simplified and lowered in cost.

The vehicle body structure of the present invention is also characterized in that the plurality of engagement plates are fixed to the rear surface of the hollow box, and predetermined gaps are formed between the front surface of the hollow box and the plurality of engagement plates.

Thus, when the front end portions of the cushioning members collide, the boxes are easily deformed because of the gaps during pushing of the front surfaces of the hollow boxes by the engagement plates. As a result, the engagement plates engage each other, and can inhibit vertical displacement reliably.

The vehicle body structure of the present invention is also characterized in that the vehicle is constituted by mounting a plurality of running wheels to a box-shaped vehicle body having the crush zones provided ahead of and behind the passenger compartment, and the vehicle rotationally drives the running wheels while being supplied with an electric power, whereby the vehicle can travel along dedicated tracks.

Thus, the vehicle body structure of the present invention can be applied to the rubber-tired new traffic vehicle which runs automatically in an unmanned manner on dedicated tracks, and can increase the safety of the vehicle reliably without aggravating appearance quality or air resistance.

BRIEF DESCRIPTION OF THE DRAWINGS

FIG. 15 is a schematic view of a skeletal structure of a vehicle front end portion representing a vehicle body structure according to a fourth embodiment of the present invention.

BEST MODE FOR CARRYING OUT THE INVENTION

Embodiments of the present invention will be described in detail based on the accompanying drawings.

[First Embodiment]

A vehicle, to which the vehicle body structure of the present embodiment is applied, is used as a rubber-tired new traffic vehicle, as a track type medium duty transport system, which automatically runs on dedicated tracks in an unmanned manner while an electric motor is receiving supply of an electric power from electric-car lines over the tracks to drive running wheels rotationally.

Figure 11:
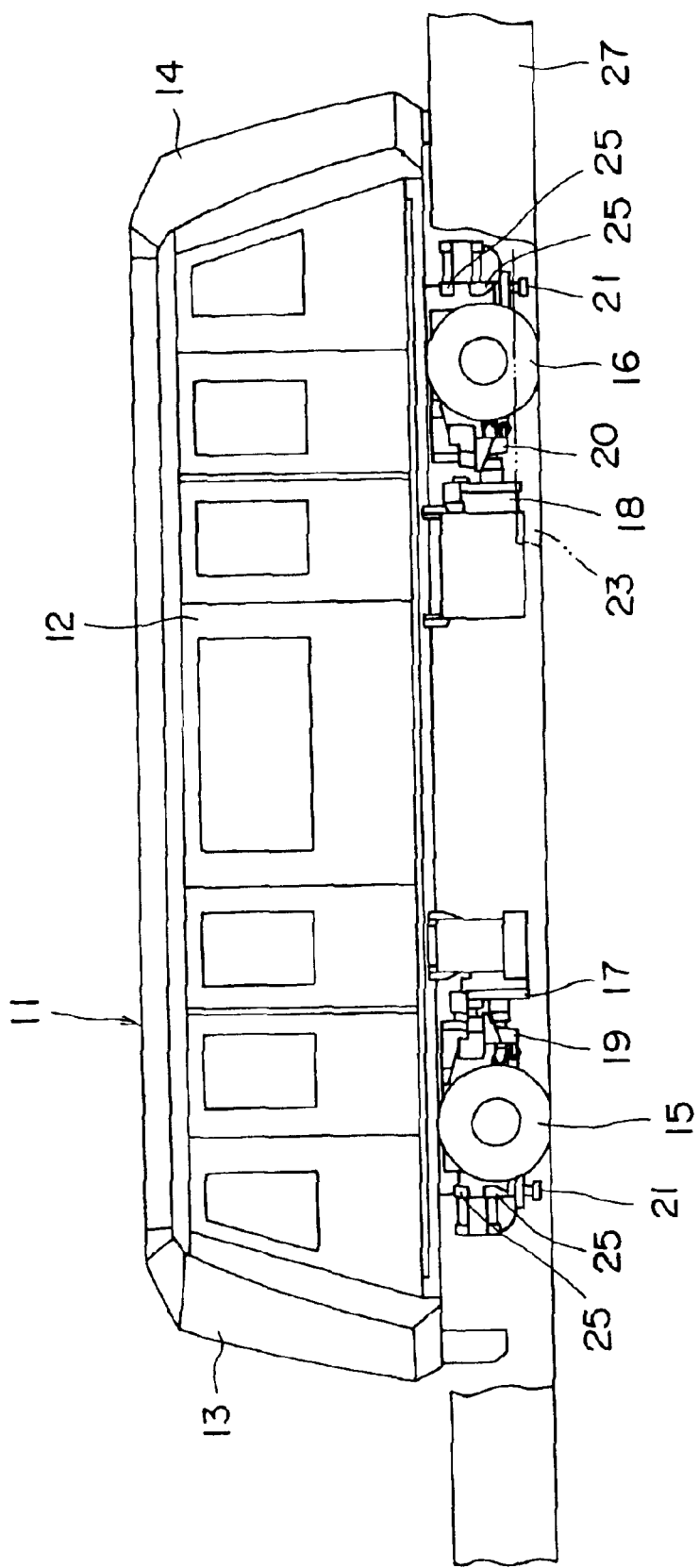
FIG. 11 is a side view of a vehicle.
Figure 12:
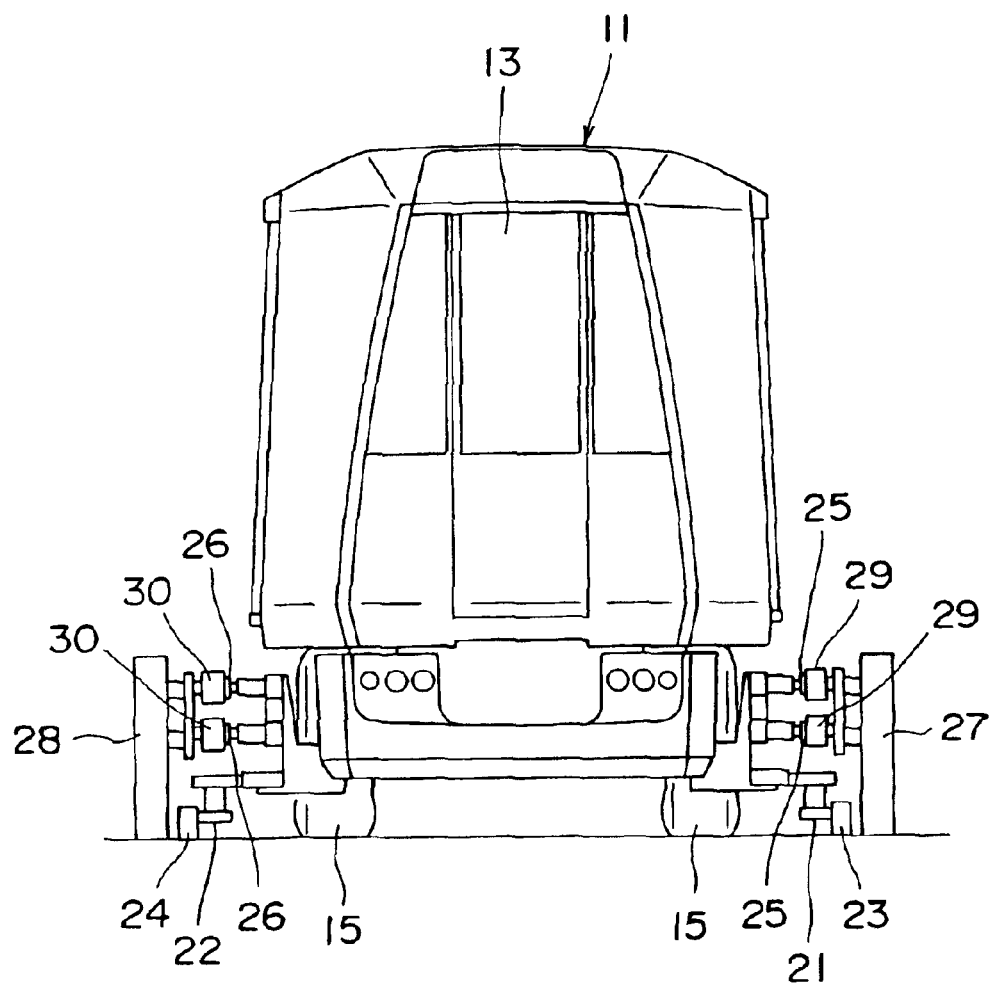
FIG. 12 is a front view of the vehicle.

That is, as shown in FIGS. 11 and 12 in the present embodiment, a vehicle 11 has a passenger compartment 12 formed at the center, and has a front gable portion 13 and a rear gable portion 14 formed at the front and rear ends to serve as crush zones. Below a vehicle body, right and left wheels 15 and right and left wheels 16 as pairs are mounted at the front and the back. The wheels 15, 16 are rotationally drivable by driving units 17, 18 having drive motors, and are steerable by steering units 19, 20. Left and right guide wheels 21 and 22 as pairs are mounted on the sides of the vehicle body, and the respective guide wheels 21 and 22 are rollable on left and right guide walls 23 and 24. Furthermore, left and right power collectors 25 and 26 as pairs are mounted on the sides of the vehicle body, and the respective power collectors 25 and 26 are in sliding contact with electric-car lines 29 and 30 annexed to left and right side walls 27 and 28. Control instruments for the driving units 17, 18 and the steering units 19, 20 are loaded on the aforementioned front gable portion 13 and rear gable portion 14.

Thus, the driving units 17, 18 are supplied with an electric power from the electric-car lines 29, 30 via the power collectors 25, 26 to drive the wheels 15, 16 rotationally. The guide wheels 21, 22 are guided rollingly by the guide rails 23, 24. The steering units 19, 20 steer the wheels 15, 16. Thus, the vehicle can run along predetermined dedicated tracks. The rubber-tired new traffic vehicle 11 runs in confinement to the tracks comprising the guide wheels 21, 22 and the guide rails 23, 24. Hence, in case a collision accident to the vehicles occurs, the vehicles 11 collide without shifting sideways. On this occasion, the front gable portion 13 and the rear gable portion 14 are crushed as crush zones, whereby the shock of the collision can be absorbed.

In the front gable portion 13 of the above rubber-tired new traffic vehicle 11, as shown in FIGS. 1 to 8, end portions of a U-shaped inner bumper 32 are connected to each of front and rear end portions of side frames 31 located on both sides of the vehicle body (the inner bumper at the rear end portion is not shown). The side frame 31 has a closed sectional shape, while the inner bumper 32 has a ⊐-shaped sectional shape open rearward. An underframe 33 is constituted by constructing a plurality of transverse beams (not shown) inwardly of the side frames 31 and the inner bumper 32, and attaching a floor board 34 onto the transverse beams. Right and left side reinforcing beam members 35 as a pair are disposed on both sides of a front end portion of the underframe 33. A front end portion of the side reinforcing beam member 35 is connected to the inner bumper 32, and a rear end portion thereof is connected to the transverse beam. The right and left side reinforcing beam members 35 are connected together by a transverse reinforcing beam member 36 of a closed sectional shape. Right and left central reinforcing beam members 37 as a pair are disposed at the center of the front end portion of the underframe 33. A front end portion of the central reinforcing beam member 37 is connected to the inner bumper 32, and a rear end portion thereof is connected to the transverse beam. The central reinforcing beam members 37 are connected in this manner so as to cross the transverse reinforcing beam member 36.

In this case, the inner bumper 32 is composed of a central portion 32a curved in a slightly arced form, and side portions 32b formed obliquely and integrally on both sides of the central portion 32a. A plurality of holes 32c as buckling strength changing means are bored in opposite side portions of the central portion 32a and in the side portions 32b. The side reinforcing beam member 35 has an L-shaped cross section, and has a longitudinally extending horizontal portion 35a and a forwardly downwardly bending portion 35b formed integrally. The front end of the bending portion 35b is bonded to the vertically inclined central portion 32a of the inner bumper 32. A plurality of holes 35c are bored in a front part of the side reinforcing beam member 35. Furthermore, the central reinforcing beam member 37 is formed from separate parts, i.e., a rear beam 37a of an L-shaped cross section and a front beam 37b in the form of a flat plate curved in a forwardly downwardly arced from. The rear beam 37a is constructed between the transverse reinforcing beam member 36 and the transverse beam, while the front beam 37b is constructed between the inner bumper 32 and the transverse reinforcing beam member 36. The front end of the front beam 37b is bonded to the vertically inclined central portion 32a of the inner bumper 32.

In the front end portion of the underframe 33, left and right cushioning members 39 and 40 as a pair are arranged side by side parallel to the left and right of the vehicle. The respective cushioning members 39 and 40 are in practically the same configuration, and are composed of bodies (buckling portions) 39b, 40b in a square tubular shape and having a plurality of openings 39a, 40a, and box-shaped, high rigidity crash portions 39d, 40d connected to the front ends of the bodies 39b, 40b. The bodies 39b, 40b have reinforcing brackets 39c, 40c fixed to base ends thereof by welding. The reinforcing brackets 39c, 40c are tied to a connecting bracket 41a by bolts 39f, 40f. On the other hand, reinforcing brackets 39g, 40g are fixed to the front ends of the bodies 39b, 40b by welding, and the crash portions 39d, 40d are tied to the reinforcing brackets 39g, 40g by bolts 39h, 40h. The crash portions 39d, 40d are connected together by a high rigidity connecting rod 41b of a square tubular shape. The crash portions 39d, 40d are located at a slight distance from the inner bumper 32, and protrusions 39e, 40e formed integrally with the crash portions 39d, 40d protrude forward from below the inner bumper 32.

In this manner, the reinforcing brackets 39c, 40c are mounted on the base ends of the bodies 39b, 40b in the left and right cushioning members 39, 40 as a pair, and are connected to the connecting bracket 41a located on the vehicle body side. On the other hand, the crash portions 39d, 40d are connected to the front ends of the bodies 39b, 40b via the reinforcing brackets 39g, 40g, and the crash portions 39d, 40d are connected by the connecting rod 41b. Thus, in response to the impact force acting on the crash portions 39d, 40d of the cushioning members 39, 40 from an oblique direction, the surface rigidity of the connecting areas of the crash portions 39d, 40d, bodies 39b, 40b and connecting bracket 41a is increased by the reinforcing brackets 39c, 40c, 39g, 40g, and the flexural rigidity of the cushioning members 39, 40 is increased by the connecting rod 41b. These measures enable the cushioning members 39, 40 to buckle properly in the longitudinal direction, thereby absorbing the impact force reliably.

A roof body is provided on both sides of the underframe 33 via side grooves (not shown). A roof frame 42 of a U-shape is fixed to a front end portion of the roof body, and connecting beams 44 are constructed between a roof transverse beam 43 and the roof frame 42. An outer bumper 45 of a V-shaped cross section is fixed outwardly of the inner bumper 32 with a predetermined gap. The outer bumper 45, almost like the aforementioned inner bumper 32, is composed of a central portion 45a, and side portions 45b formed obliquely and integrally on both sides of the central portion 45a. A plurality of holes 45c as buckling strength changing means are bored in opposite side portions of the central portion 45a and in the side portions 45b. A reinforcing material 46 is fixed to the upper surface of the central portion 45a. Left front beams 47, 48 and right front beams 47, 48 as a pair having an L-shaped cross section, and left and right side beams 49 as a pair having a ⊐-shaped cross section are constructed between the roof frame 42 and the outer bumper 45, and the end portions of these beams are fixed to the roof frame 42 and the outer bumper 45 by welding. The front beam 48 and the side beam 49 on each of the right-hand and left-hand sides are connected together by a connecting beam 50, and a plurality of holes 50a are formed in a bending portion of the connecting beam 50. The numeral 51 denotes a reinforcing bracket for connecting the front beams 48, the outer bumper 45 and the floor board 34 together.

When a collision accident to the rubber-tired new traffic vehicles 11 occurs, the lateral motion of the vehicle 11 is confined by the tracks. Thus, the probability of occurrence of a so-called offset collision is low. However, the vehicle is streamlined in consideration of its design, and the vehicle is displaced (vibrates) in the up-and-down or vertical direction in accordance with the road condition (dents and projections, hills) or the driving condition (starting or stopping, acceleration or deceleration). Hence, when the vehicles 11 collide, one of the vehicles may run onto the other vehicle, with the result that the front gable portion 13 and the rear gable portion 14 may fail to function as crush zones.

Therefore, straight portions extending along a vertical direction are formed at the front of the front gable portion 13 as the crush zone. By so doing, even if the vehicles vertically shift according to the road condition, the driving condition, etc., the straight portions of predetermined lengths collide with each other, inhibiting one of the vehicles 11 from running onto the other vehicle, and permitting the front gable portion 13 to function as the crush zone reliably. In detail, the left and right front beams 47 and 48 as constituent members constituting the front gable portion 13 are inclined and curved in harmony with the streamlined design of the vehicle 11, and have the straight portions 47a, 48a, which extend along the vertical direction, formed at the lower end portions. The lengths of the straight portions 47a, 48a are set in accordance with the amount of upward or downward displacement (vertical displacement) of the vehicle 11 during its travel. That is, as stated earlier, the amount of vertical displacement of the vehicle 11 while it is running differs according to the condition of the road on which the vehicle 11 runs, the state of driving of the vehicle 11, the vehicle body rigidity of the vehicle 11, or the performance of the suspension system. Thus, tests or calculations are performed beforehand to calculate the amount of vertical displacement. The lengths of the straight portions 47a, 48a are determined in accordance with the amount of vertical displacement. In this case, if the amount of vertical displacement of the vehicle 11 is at most L, the vehicles 11, when colliding, are likely to be displaced vertically by up to 2 L. Thus, the lengths of the straight portions 47a, 48a may be set at greater than 2 L.

The length of the straight portion 48a of the front beam 48 is greater than the length of the straight portion 47a of the front beam 47. This is because the straight portion 48a can be formed with a greater length in connection with the design of the vehicle 11, and consideration is given to higher safety. The lateral displacement of the vehicle 11 is restrained by the tracks comprising the guide wheels 21, 22 and guide rails 23, 24. However, the vehicle 11 is likely, although slightly, to be displaced laterally because of manufacturing errors or installation errors of components. Thus, the widths of the straight portions 47a, 48a are also set in consideration of the amount of this displacement.

Also, the vehicle 11 is streamlined out of consideration for its design. Thus, when the vehicles 11 collide, an impact force at collision is inputted to the front end portion of the vehicle 11, namely, a portion slightly above the inner bumper 32. In this case, since the side reinforcing beam members 35 and the central reinforcing beam members 37 are located below the inner bumper 32, the reinforcing beam members 35, 37 and the floor board 34 are bent downward, when the impact force is inputted to the portion upward of the inner bumper 32. As a result, flexural load acts on the cushioning members 39, 40 from above, thereby bending down the cushioning members 39, 40. Thus, these cushioning members 39, 40 cannot properly absorb, by buckling, the impact force inputted from ahead.

Hence, the aforementioned side reinforcing beam member 35 is provided with the bending portion 35b, and the central reinforcing beam member 37 is provided with the curved front beam 37b, as auxiliary members which permit the reinforcing beam members 35, 37 to bend away from (namely upwards) the cushioning members 39, 40 when the impact force is inputted to the front end portion of the vehicle 11. Furthermore, in order that the crash portions 39d, 40*d* of the cushioning members 39, 40 are not pushed and sloped by the retraction of the inner bumper 32 upon primary collision of the front end portions of the vehicles 11, the protrusions 39*e*, 40*e* formed on the front surfaces of the crash portions 39*d*, 40*d* are used as protrusions for secondary collision.

The front gable portion 13 is so constituted by the underframe 33, bumpers 32, 45, roof frame 42, and beams 47, 48, 49. An outer wall of FRP (not shown) is attached to the exterior of the structure formed from the skeleton including the passenger compartment 12, the front gable portion 13, and the rear gable portion 14 to constitute the vehicle 11.

In the foregoing descriptions of the embodiment, the front gable portion 13 is formed on one side of the passenger compartment 12 of the vehicle 11, while the rear gable portion 14 is formed on the other side, and only the front gable portion 13 has been explained in detail. The rear gable portion 14 also has the same structure as that of the front gable portion 13, serves as the crush zone, and possesses the straight portions. The vehicle 11 has been described, with the front gable portion 13 facing forward in the moving direction. However, the vehicle 11 can also run, with the rear gable portion 14 facing forward in the moving direction.

The thus configured rubber-tired new traffic vehicle 11 is operated smoothly and safely in an unmanned manner by the operation management system. However, if control instruments fail, various manual operations and manipulations by the driver are possible. In this case, the travel speed is limited to a low speed. In the case of such a manual operation or manipulation of the vehicle 11 by the driver, a collision accident to the vehicles 11 may occur owing to an erroneous operation or the like. Thus, as stated above, the front gable portion 13 and the rear gable portion 14, which serve as the crush zones, are formed ahead of and behind the passenger compartment 12. The straight portions 47*a*, 48*a* extending along the vertical direction are formed at the lower ends of the front beams 47, 48 constituting the front gable portion 13 and the rear gable portion 14. The cushioning members 39, 40 are mounted in the lower portions of the front gable portion 13 and the rear gable portion 14. Because of this arrangement, the front gable portion 13 and the rear gable portion 14 reliably function as the crush zones.

In order that the cushioning members 39, 40 properly function, the bending portions 35*b* and front beams 37*b* as auxiliary members are provided at the reinforcing beam members 35, 37 as the constituent members constituting the front gable portion 13 and the rear gable portion 14, whereby the reinforcing beam members 35, 37 bend upward away from the cushioning members 39, 40 at the time of collision. Besides, the protrusions 39*e*, 40*e* for secondary collision are formed at the crash portions 39*d*, 40*d* of the cushioning members 39, 40. These protrusions 39*e*, 40*e* of one vehicle 11 come into secondary collision with the protrusions 39*e*, 40*e* of the other vehicle 11 so that the crash portions 39*d*, 40*d* of the cushioning members 39, 40 will not be pushed and sloped due to the retraction of the bumpers 32, 45 upon primary collision of the front end portions of the vehicles 11.

In order that the cushioning members 39, 40 properly function even in oblique collision, the reinforcing brackets 39*c*, 40*c*, 39*g*, 40*g* are mounted to the connecting areas of the bodies 39*b*, 40*b*, the crash portions 39*d*, 40*d* and the connecting bracket 41*a*, whereby the surface rigidity at the connection areas is increased. In addition, the left and right crash portions 39*d* and 40*d* are connected by the connecting rod 41*b*, whereby the flexural rigidity of the cushioning members 39, 40 is increased.

In detail, when the vehicles 11 collide, there may be a collision of the front gable portions 13 or the rear gable portions 14 of the vehicles 11 colliding head-on, or a collision of the rear gable portion 14 and the front gable portion 13 when the preceding vehicle is hit by the following vehicle. The vehicle 11 runs, with its lateral displacement being nearly restrained by the guide wheels 21, 22 and guide rails 23, 24. However, its vertical displacement is not restrained, and the vehicle vibrates (is displaced) in the up-and-down direction in accordance with the rigidity of the vehicle body, the performance of the suspension, the irregularities of the road surface or hills, at the time of starting or stopping, or at acceleration or deceleration. Hence, when the vehicles 11 are displaced in opposite directions, and collide head-on, and the front gable portions 13 strike each other, one of the vehicles runs onto the other vehicle, because the vehicle 11 is streamlined out of consideration for its design. However, the straight portions 47*a*, 48*a* are present at the front beams 47, 48 of the front gable portion 13. Thus, even when the front gable portions 13 displaced vertically in opposite directions collide with each other, the straight portions 47*a*, 48*a* strike the straight portions 47*a*, 48*a*. The resulting impact force is transmitted to the front gable portion 13 and the rear gable portion 14 via the straight portions 47*a*, 48*a*. Thus, the front gable portion 13 and the rear gable portion 14 are crushed as the crush zones, whereby the impact force can be absorbed, and the impact force transferred to the passenger compartment 12 can be reduced.

The method of alleviating the impact force by the crush zones will now be described concretely. When the front gable portion 13 (rear gable portion 14) is crushed as the crush zone, the impact force in the collision enters the outer bumper 45 from the outer wall of FRP, is admitted into the front beams 47, 48 via the straight portions 47*a*, 48*a*, and is inputted to the crash portions 39*d*, 40*d* (protrusions 39*e*, 40*e*) of the cushioning members 39, 40. Under these conditions, the central portions 32*a*, 45*a* (reinforcing material 46) of the bumpers 32, 45 are pushed, and the opposite side portions 32*b*, 45*b* are buckled in the longitudinal direction by the plural holes 32*c*, 45*c*. Also, the side reinforcing beam members 35 are buckled and bent into deformation by the plural holes 35*c*, as are the central reinforcing beam members 37 by the front beams 37*b*, and as are the connecting beams 50 by the plural holes 50*a*. Moreover, the cushioning members 39, 40 collide with the cushioning members 39, 40 to start longitudinal buckling. Then, the roof frame 42 and the underframe 33 start buckling, and the entire front gable portion 13 is crushed, whereby the impact force in the collision can be absorbed.

Since the front gable portion 13 is crushed during a head-on collision to absorb the impact force, the impact force transmitted to the passenger compartment 12 can be relieved to ensure safety of the crew and passengers in the passenger compartment 12. Experiments were conducted in which the vehicles 11 with a weight of 24 tons and a riding rate in the passenger compartment 12 of about 100% collided head-on at a speed of 11 km/h. Load acting on the passenger compartment 12 (position of the center of gravity) was 4.5 G with the conventional vehicle body structure, and the passenger compartment 12 was deformed. In the vehicle body structure of the present invention, the load was 3.5 G, and the passenger compartment 12 was not deformed.

Figure 1:
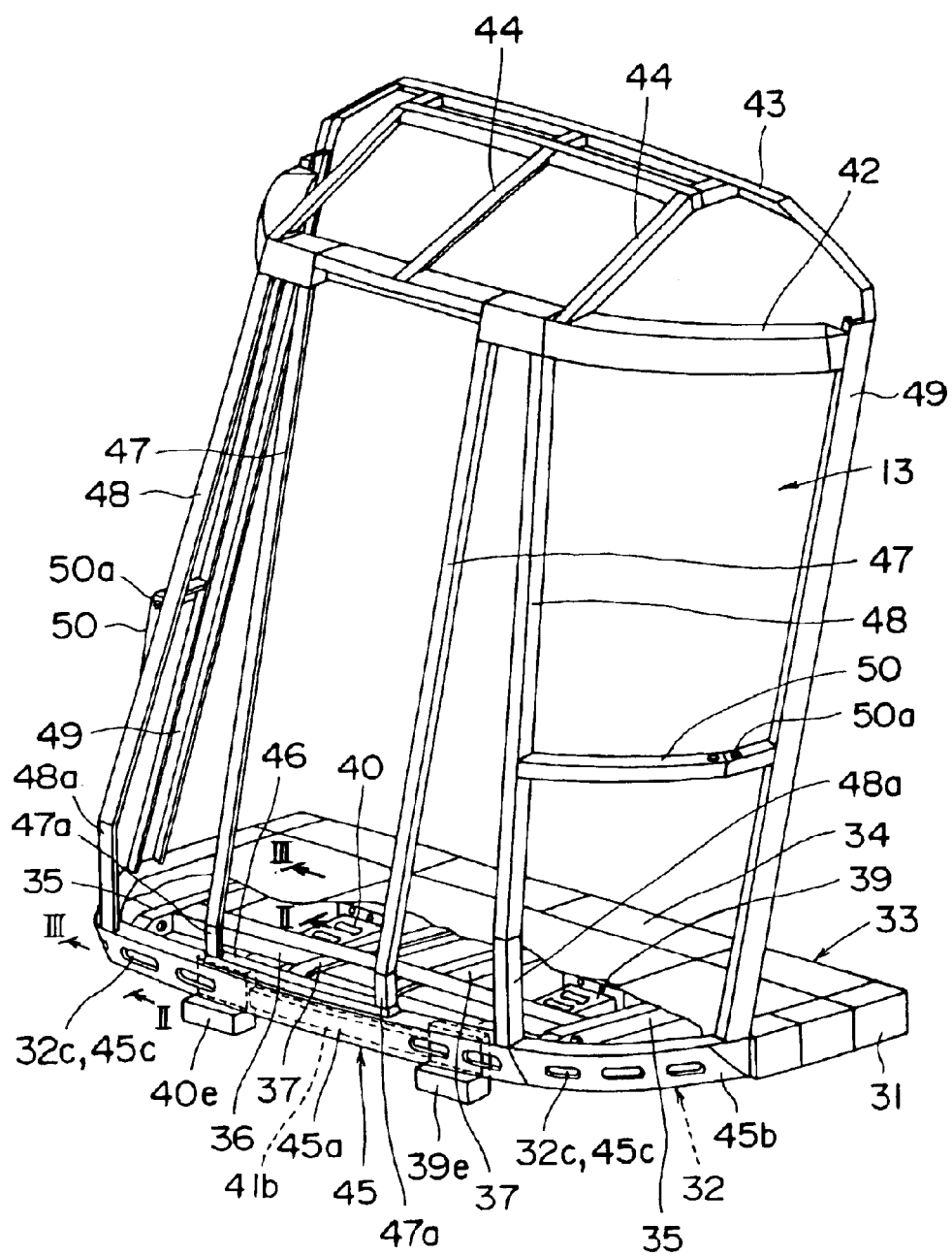
FIG. 1 is a schematic view of a skeletal structure of a vehicle front end portion representing a vehicle body structure according to a first embodiment of the present invention.
Figure 2:
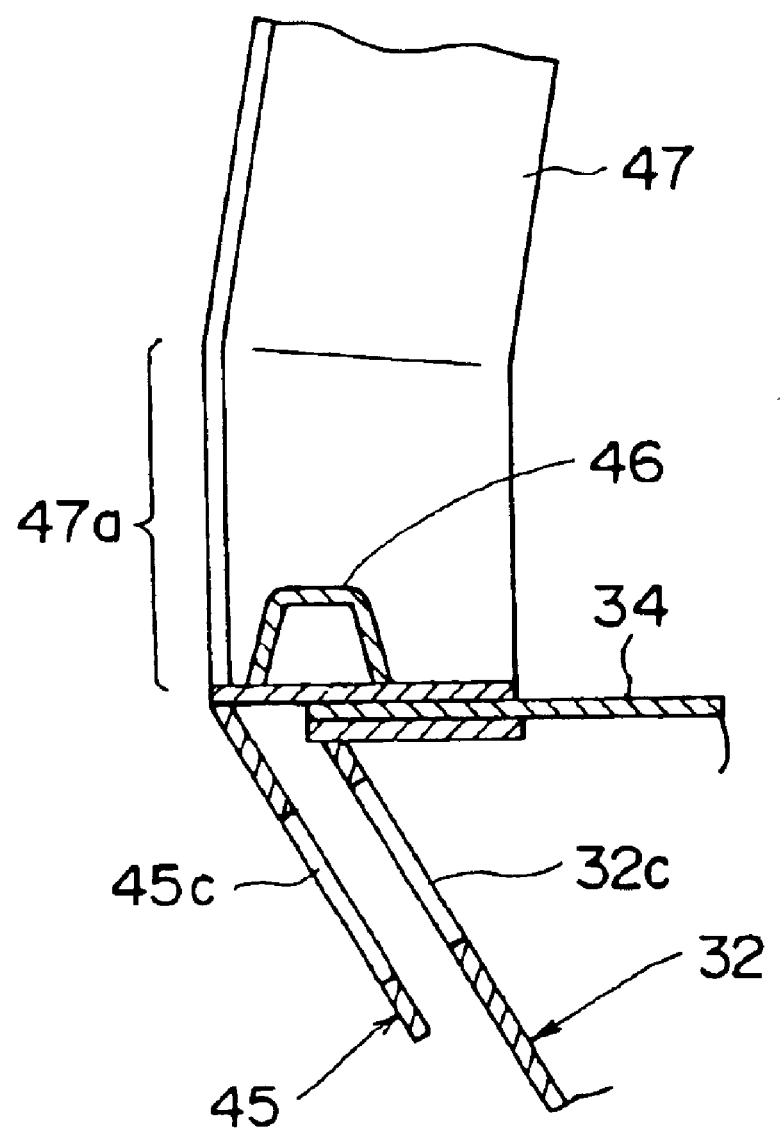
FIG. 2 is a sectional view taken on line II—II of FIG. 1.
Figure 3:
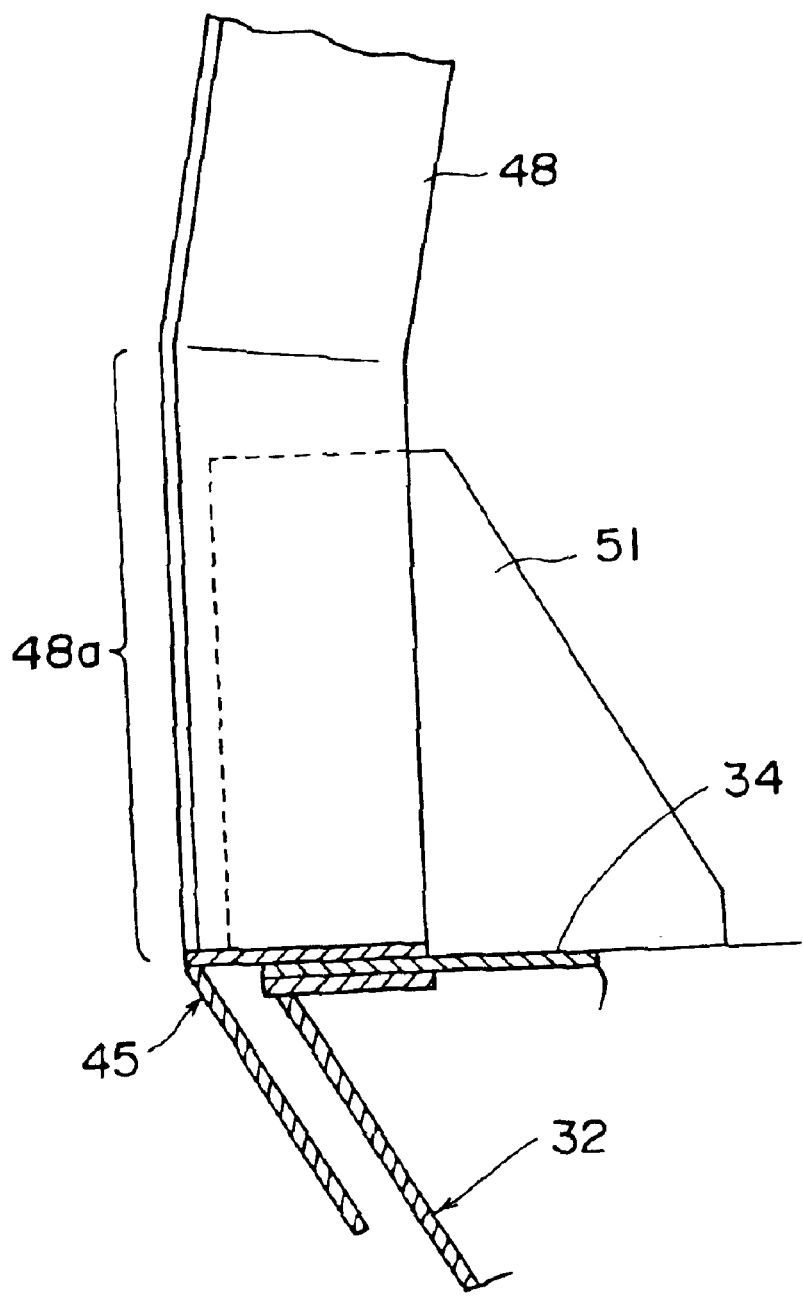
FIG. 3 is a sectional view taken on line III—III of FIG. 1.
Figure 4:
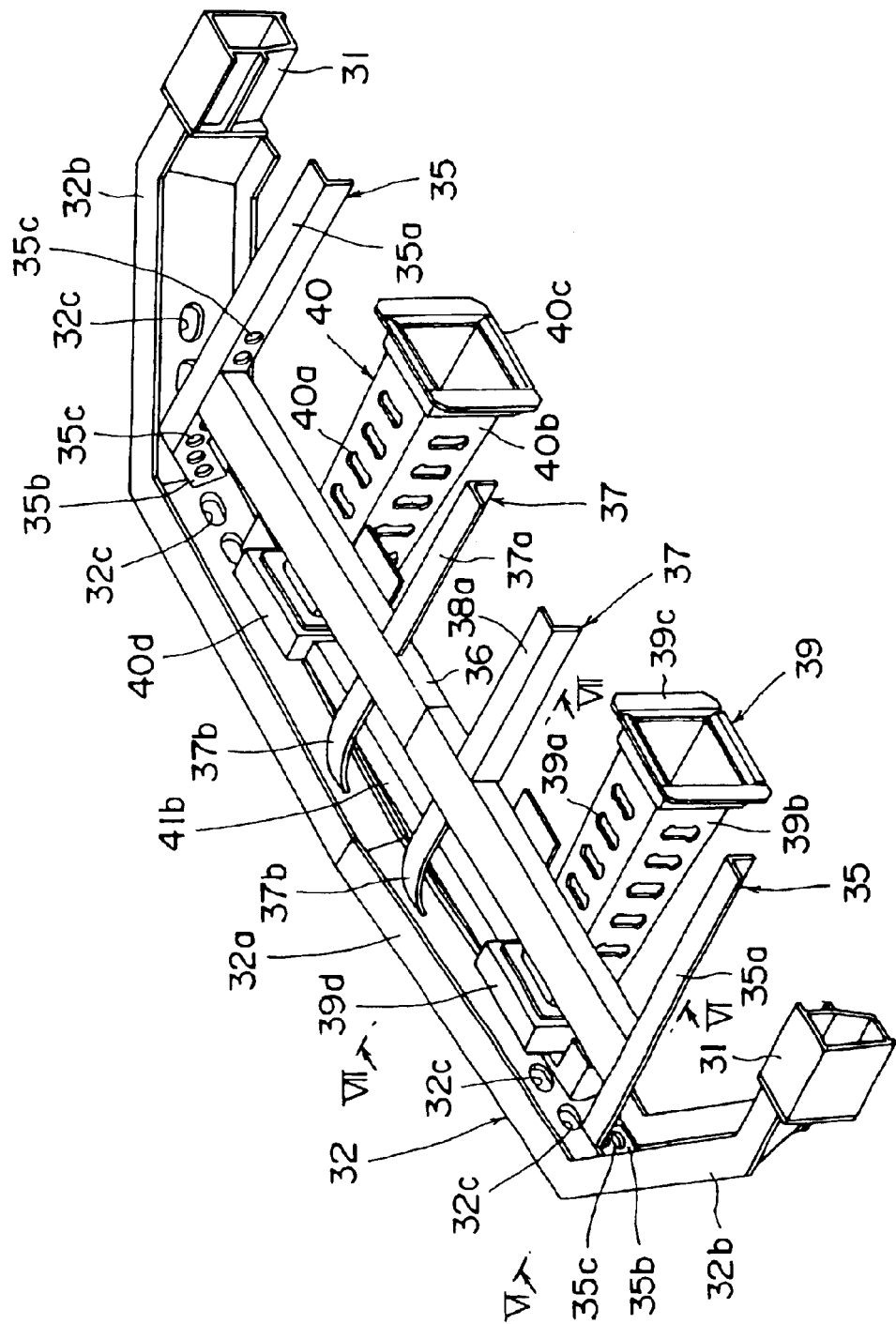
FIG. 4 is a schematic perspective view of an underframe front end portion.
Figure 5:
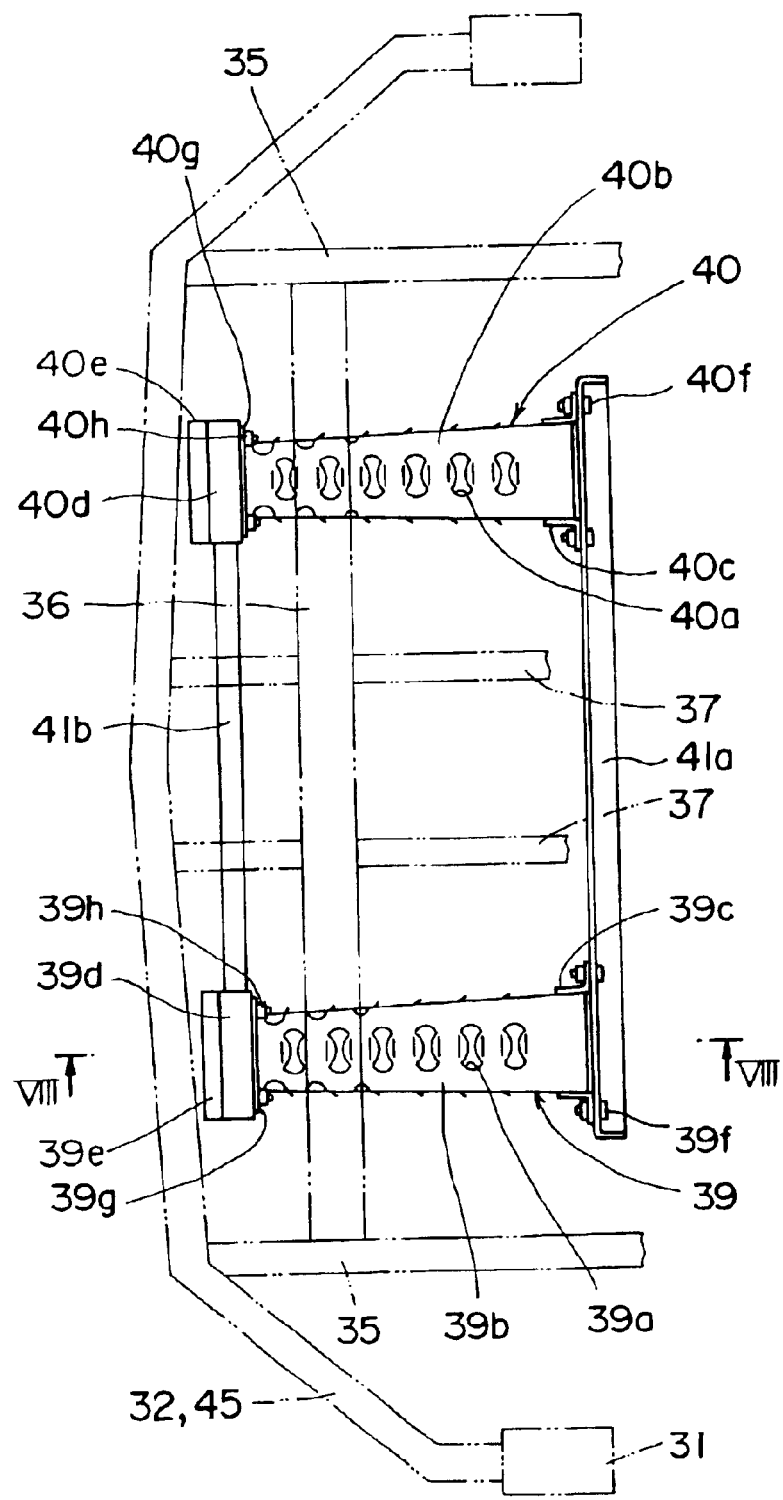
FIG. 5 is a plan view of the underframe front end portion.
Figure 6:
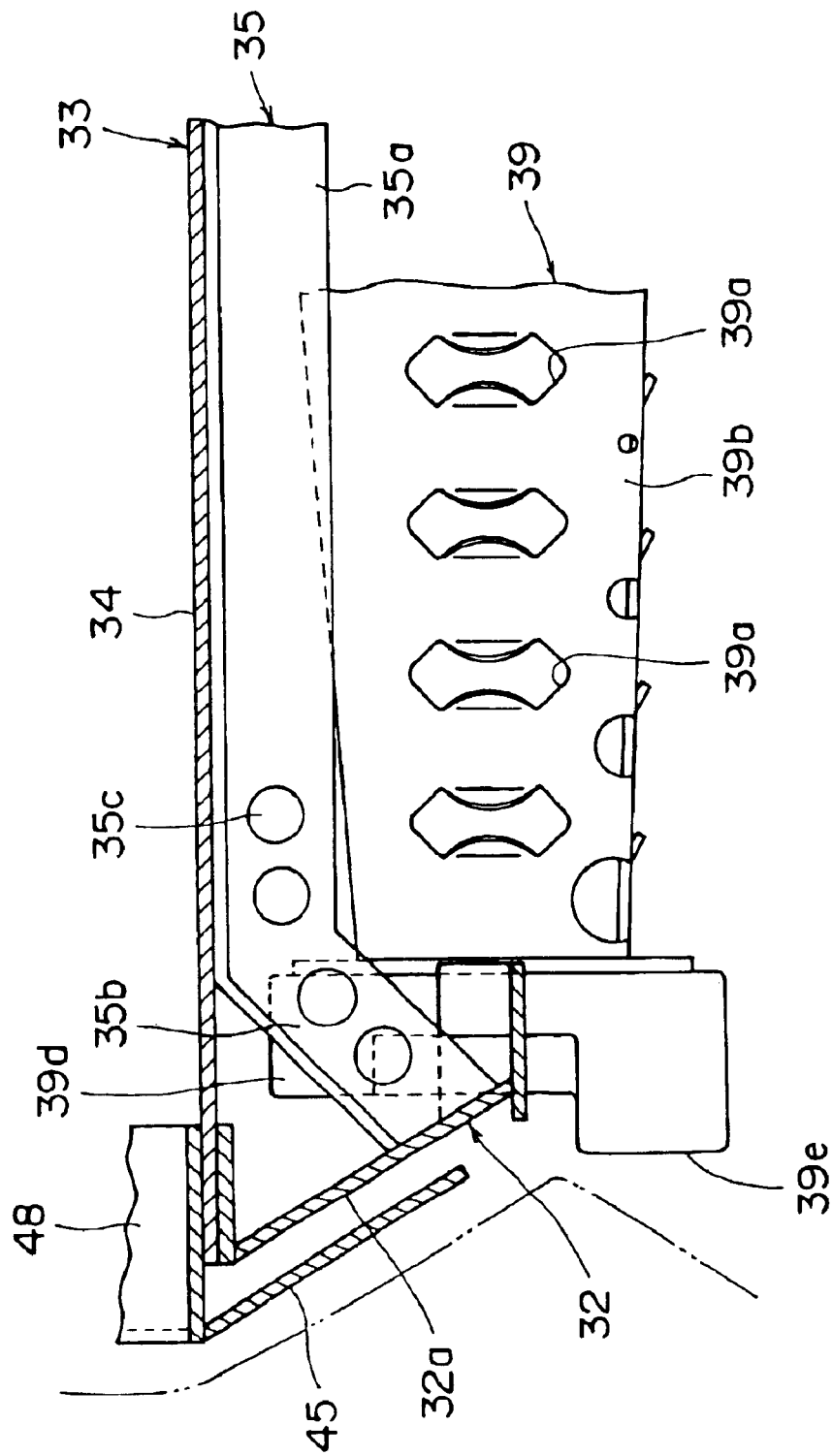
FIG. 6 is a sectional view taken on line VI—VI of FIG. 4.
Figure 7:
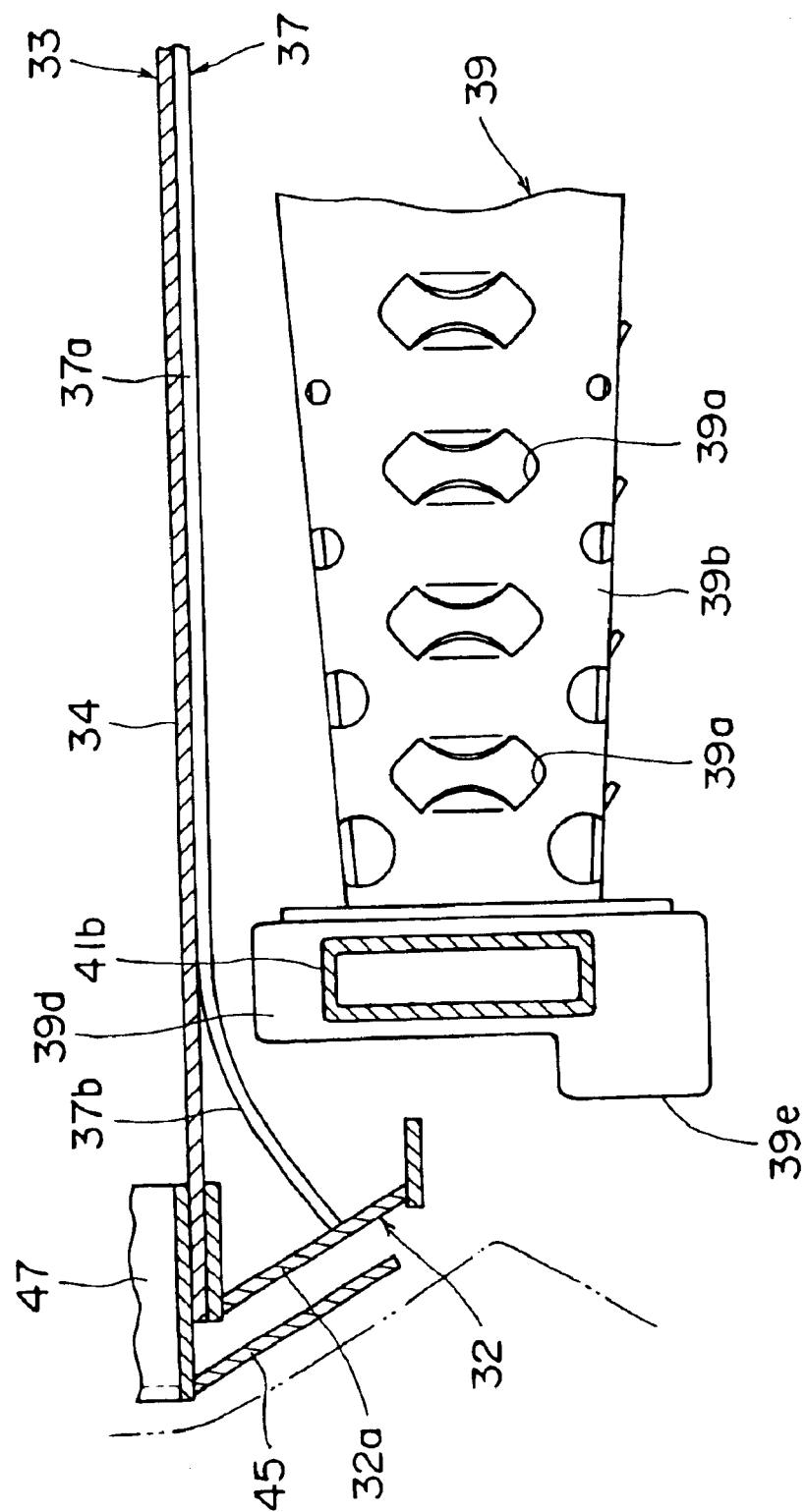
FIG. 7 is a sectional view taken on line VII—VII of FIG. 4.
Figure 8:
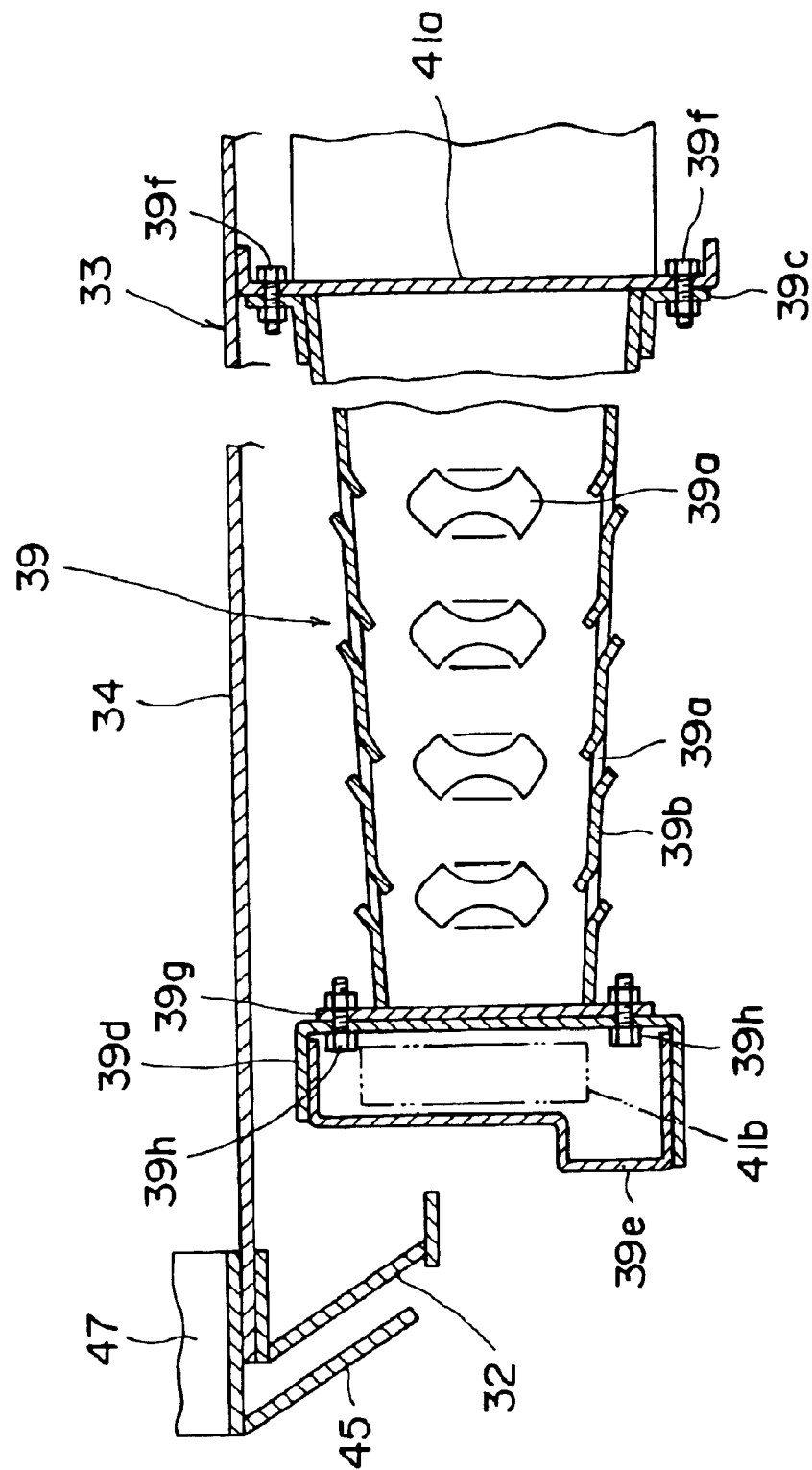
FIG. 8 is a sectional view taken on line VIII—VIII of FIG. 5.
Figure 9:
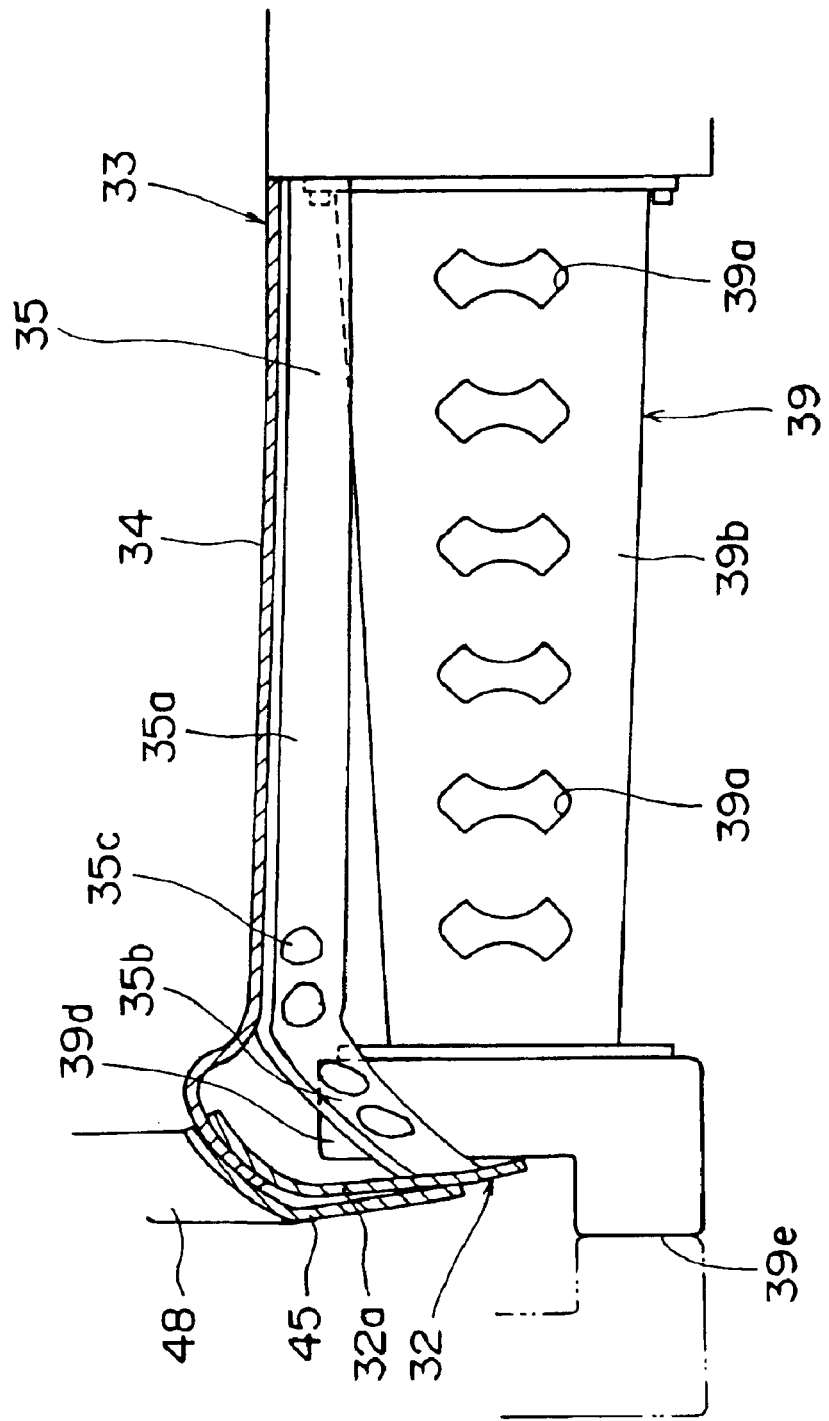
FIG. 9 is a schematic view showing a deformed state of the vehicle front end portion at the time of a head-on collision.

The impact force during collision of the vehicles 11 is inputted to the straight portions 47*a*, 48*a* of the front beams 47, 48 located above the underframe 33. Thus, the bumpers 45, 32 crushed via the front beams 47, 48 deform the underframe 33. As shown in FIG. 9, the bending portions 35b, which bend downwardly, are provided in the front end portions of the side reinforcing beam members 35, and the front beams 37b, which are curved downwardly, are provided in the front end portions of the central reinforcing beam members 37. Hence, when the impact force at the time of collision of the vehicles 11 is inputted to the reinforcing beam members 35, 37 via the bumpers 45, 32, these reinforcing beam members 35, 37 are bent and deformed toward the bent or curved upper area together with the floor board 34 so as to become away from the cushioning members 39, 40. Thus, it never happens that the floor board 34 bends downward along with the reinforcing beam members 35, 37 to impose a flexural load on the cushioning members 39, 40 from above to deform them. Hence, the cushioning members 39, 40 are free from the impairment of their essential function of absorbing the impact force by their longitudinal buckling. At this time, moreover, the protrusions 39e, 40e collide with the protrusions 39e, 40e, so that the cushioning members 39, 40 are not inclined, but properly buckled in the longitudinal direction by the impact force inputted from ahead, and can absorb the collision force reliably.

Also, the cushioning members 39, 40 have the protrusions 39e, 40e formed in the lower portions of the crash portions 39d, 40d at the front ends. The bumpers 45, 32 crushed by the impact force press the upper parts of the cushioning members 39, 40, trying to incline the crash portions 39d, 40d. Before then, however, the protrusions 39e, 40e come into a secondary collision with the protrusions 39e, 40e of the other party. Thus, the inclination of the crash portions 39d, 40d is prevented, and the cushioning members 39, 40 are properly buckled in the longitudinal direction by the impact force inputted from ahead, being capable of absorbing the collision force reliably.

Furthermore, at an initial stage of the head-on collision of the vehicles 11, the opposite side portions 45b are longitudinally buckled via the plural holes 45c by the impact force inputted to the central portion 45a (reinforcing material 46) of each bumper 32, 45, so that the central portion 45a is displaced straightly rearward. Hence, the impact force in the collision is not allowed to escape sideways, but is directly accepted by the front gable portion 13 and absorbed thereby. Consequently, displacement of the vehicles after collision can be inhibited to prevent spread of damage to the surroundings.

The plural holes 35c are provided in the side reinforcing beam members 35, the front beams 37b of the central reinforcing beam members 37 are shaped into a plate form, and the plural holes 50a are provided in the connecting beams 50. By these measures, buckling of each member at the time of collision is controlled, so that the impact force can be reliably accepted and absorbed by the front gable portion 13.

When the vehicles 11 collide head-on, the impact force can be reliably absorbed by the front gable portion 13 or rear gable portion 14 and the cushioning members 39, 40, as stated earlier. When the vehicles 11 collide while the vehicle 11 is running on a curve, the impact force obliquely acts on the front gable portion 13 or rear gable portion 14 and the cushioning members 39, 40. According to the vehicle body structure of the present embodiment, even in such an oblique collision, the cushioning members 39, 40 can absorb the impact force reliably.

Figure 10:
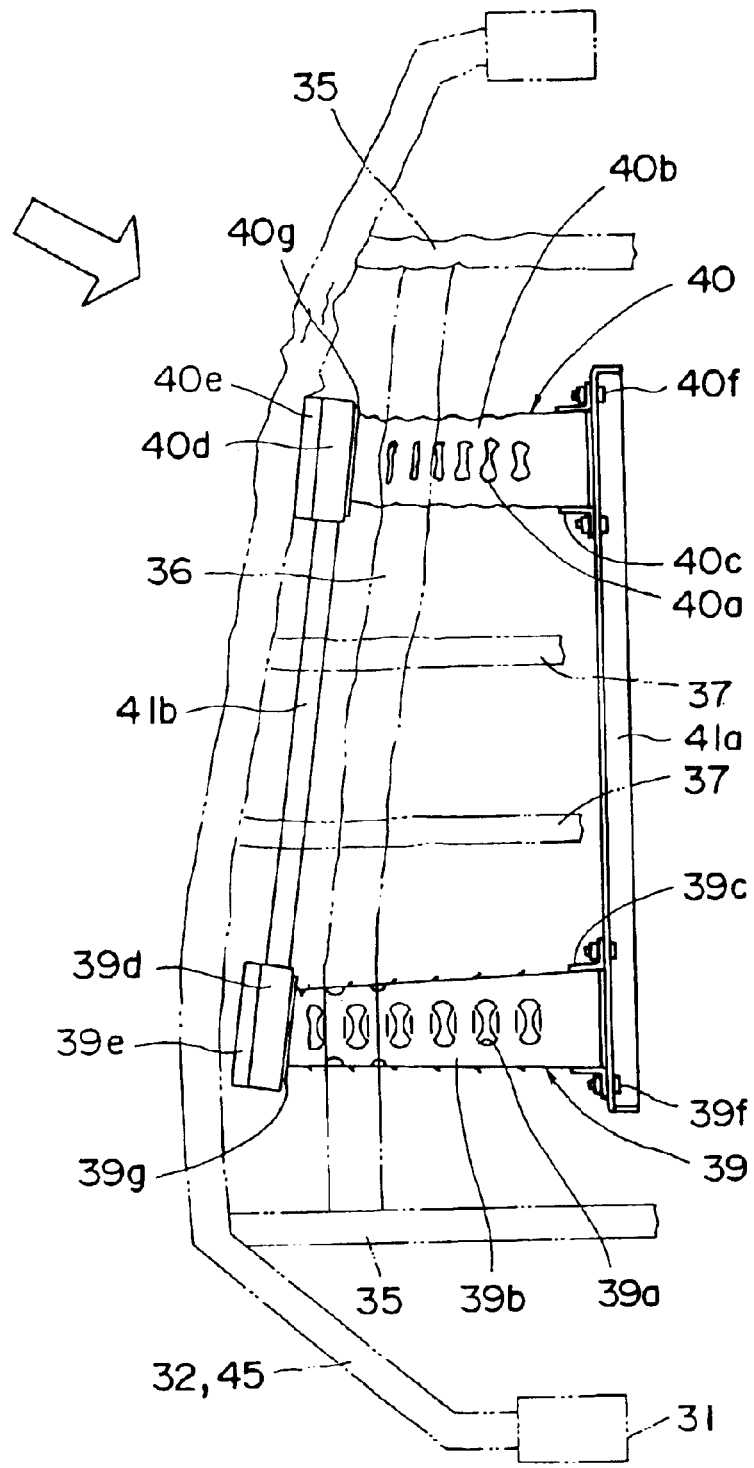
FIG. 10 is a plan view of the underframe front end portion showing a deformed state of a cushioning member at the time of a collision.

In detail, as shown in FIG. 10, when an impact force in a collision is unputted to the front gable portion 13 from a rightward oblique direction, the right side portions 32b, 45b of the bumpers 32, 45 are pushed and buckled, and the reinforcing beam members 35, 37 on the right side are buckled and bent. Also, the impact force in the collision is obliquely inputted to the crash portion 40d of the cushioning member 40, directly or indirectly via the bumpers 32, 45. In this case, the cushioning member 40 is about to be toppled leftward (toward the cushioning member 39) by the impact force imputted obliquely. However, the crash portion 40d of the cushioning member 40 is connected to the crash portion 39d of the cushioning member 39 by the connection rod 41b, so that a deterrent force works there, inhibiting the toppling of the cushioning member 40. Besides, the crash portion 40d of the cushioning member 40 is about to be bent relative to the body 40b by the impact force obliquely imputted to the crash portion 40d. However, the reinforcing bracket 40g is interposed between the crash portion 40d and the body 40b, and the reinforcing bracket 40c disposed at the base end portion of the body 40b is mounted to the connection bracket 41a to form a sturdy structure. A deterrent force acts there, inhibiting the bending of the crash portion 40d.

Hence, the cushioning member 40 does not topple toward the cushioning member 39, and the crash portion 40d does not bend, but properly buckles in the longitudinal direction, becoming capable of absorbing the impact force in the oblique collision without fail.

In the above-described embodiment, the straight portions 47a, 48a extending along the vertical direction are formed at the lower end portions of the front beams 47, 48 as the constituent members constituting the front gable portion 13 which serves as the crush zone. However, independently of the front gable portion 13, straight portions may be formed at the members fixed ahead of the front gable portion 13. The straight portions 47a, 48a are formed at the total four front beams 47, 48. However, the straight portion may be formed on at least one front beam. When one straight portion is to be formed, it is desirable to provide a beam at the center in the lateral direction of the front gable portion 13 and form the straight portion at this beam, thereby shouldering the collision load as laterally equal halves.

In the above embodiment, the inner bumper 32 and the outer bumper 45 disposed along the lateral direction are applied as the constituent members disposed in a direction nearly perpendicular to the moving direction of the vehicle in order to constitute the crush zone, and the holes 32c, 45c are provided as the buckling strength changing means. However, constituent members extending along the vertical direction may be provided, and holes may be formed there. Instead of the holes 32c, 45c, concave portions, notches, or thin plate portions may be used.

In the above embodiment, the bending portions 35b and the curved front beams 37b are provided, in the reinforcing members 35, 37, as the auxiliary members for bending the reinforcing members 35, 37 in a direction apart from the cushioning members 39, 40 when the impact force is inputted. However, this structure is not restrictive.

In the above embodiment, the reinforcing brackets 39c, 40c are provided as the means of reinforcing the vehicle body and the bodies 39b, 40b, and the reinforcing brackets 39g, 40g are provided as the reinforcing members for the bodies 39b, 40b and the crash portions 39d, 40d. However, those parts may be reinforced by partially increasing their plate thicknesses, without mounting the separate members thereto.

[Second Embodiment]

Figure 13:
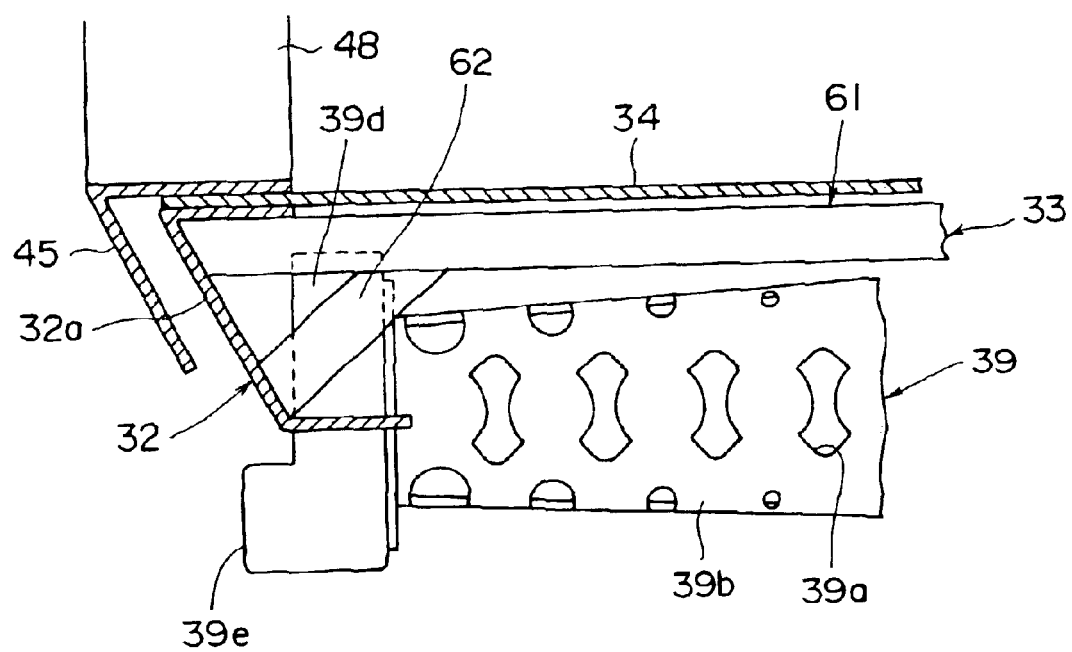
FIG. 13 is an essential vertical sectional view of a front gable portion represention a vehicle body structure according to a second embodiment of the present invention.

In the present embodiment, as shown in FIG. 13, a side reinforcing beam member 61 in a horizontal posture is disposed at a front end portion of an underframe 33 in a front gable portion 13, and a front end of the side reinforcing beam member 61 is connected to an inner bumper 32, while its rear end is connected to a transverse beam. An auxiliary member 62 extending along a forwardly downward direction is disposed in a front portion of the side reinforcing beam member 61. A front end of the auxiliary member 62 is bonded to a vertically inclined central portion 32*a* of the inner bumper 32, and a base end of the auxiliary member 62 is bonded to a front end lower portion of the side reinforcing beam member 61. Thus, when an impact force is inputted to the side reinforcing beam member 61 via the bumpers 45, 32 at the time of collision of the vehicles 11, the side reinforcing beam member 61 is bent upward, namely, bent away from the cushioning member 39 and deformed in this state, since the side reinforcing beam member 61 has a lower portion supported by the auxiliary member 62. Thus, it never happens that the side reinforcing beam member 61 and the floor board 34 bend the cushioning member 39 from above. The cushioning member 39 is properly buckled in the longitudinal direction by the impact force inputted from ahead, and can absorb the collision force reliably.

Aside from this method, it is permissible, for example, to form a notch in the underside of the horizontal side reinforcing beam member, or decrease the plate thickness of its underside, thereby decreasing its rigidity. By so doing, the side reinforcing beam member may be made to bend upward. The reinforcing members 35, 37 are applied as the constituent members of the crush zone for providing the auxiliary member. However, these members are not limitative, and any members adjacent to the cushioning members 39, 40 can be applied. In any cases, the same actions and effects as described earlier can be produced.

In the aforementioned embodiment, the cushioning members 39, 40 are constituted by forming the plural openings 39*a*, 40*a* in the bodies 39*b*, 40*b* of a square tubular shape, the base end portions of the cushioning members are connected to the transverse beam, and the crash portions 39*d*, 40*d* and protrusions 39*e*, 40*e* are formed at the front end portions of the cushioning members 39, 40. However, this structure is not limitative.

[Third Embodiment]

Figure 14:
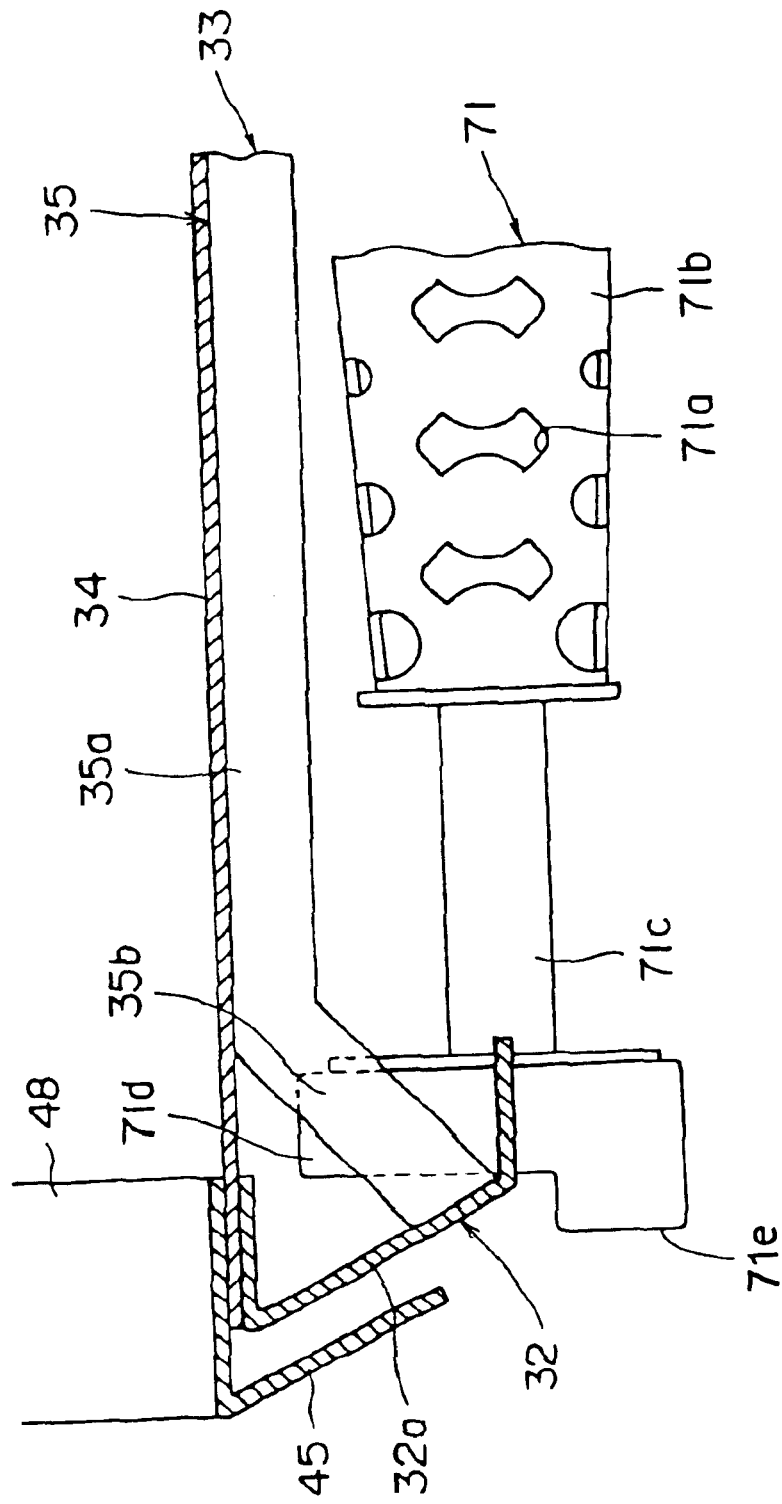
FIG. 14 is an essential vertical sectional view of a front gable portion representing a vehicle body structure according to a third embodiment of the present invention.

In the present embodiment, as shown in FIG. 14, a cushioning member 71 having a base end portion fixed to a transverse beam (not shown) is constituted such that a crash portion 71*d* is connected via a connecting member 71*c* to a front end portion of a body 71*b* of a square tubular shape having a plurality of openings 71*a* formed therein, and a protrusion 71*e* is formed in the crash portion 71*d*. By providing the connecting member 71*c*, a space can be secured below a floor board 34, and other members can be mounted in this space. The shape of the body of the cushioning member is not restricted to a square tubular shape, but may be a cylindrical shape or a ⊐-shape in cross section.

In the aforementioned embodiment, the reinforcing members and the cushioning members are provided below the position of entry of the impact force in the crush zone (front gable portion 13), and the reinforcing members are bent away from the cushioning members, namely upward, at the entry of the impact force. However, if the reinforcing members and the cushioning members are provided above the position of entry of the impact force in the crush zone, an auxiliary member may be provided so that the reinforcing members are bent away from the cushioning members, namely downward. Moreover, the vehicle body structure of the present invention has been described as being applied to the rubber-tired new traffic vehicle, but can be applied to general railway vehicles or automobile vehicles.

[Fourth Embodiment]

Figure 16:
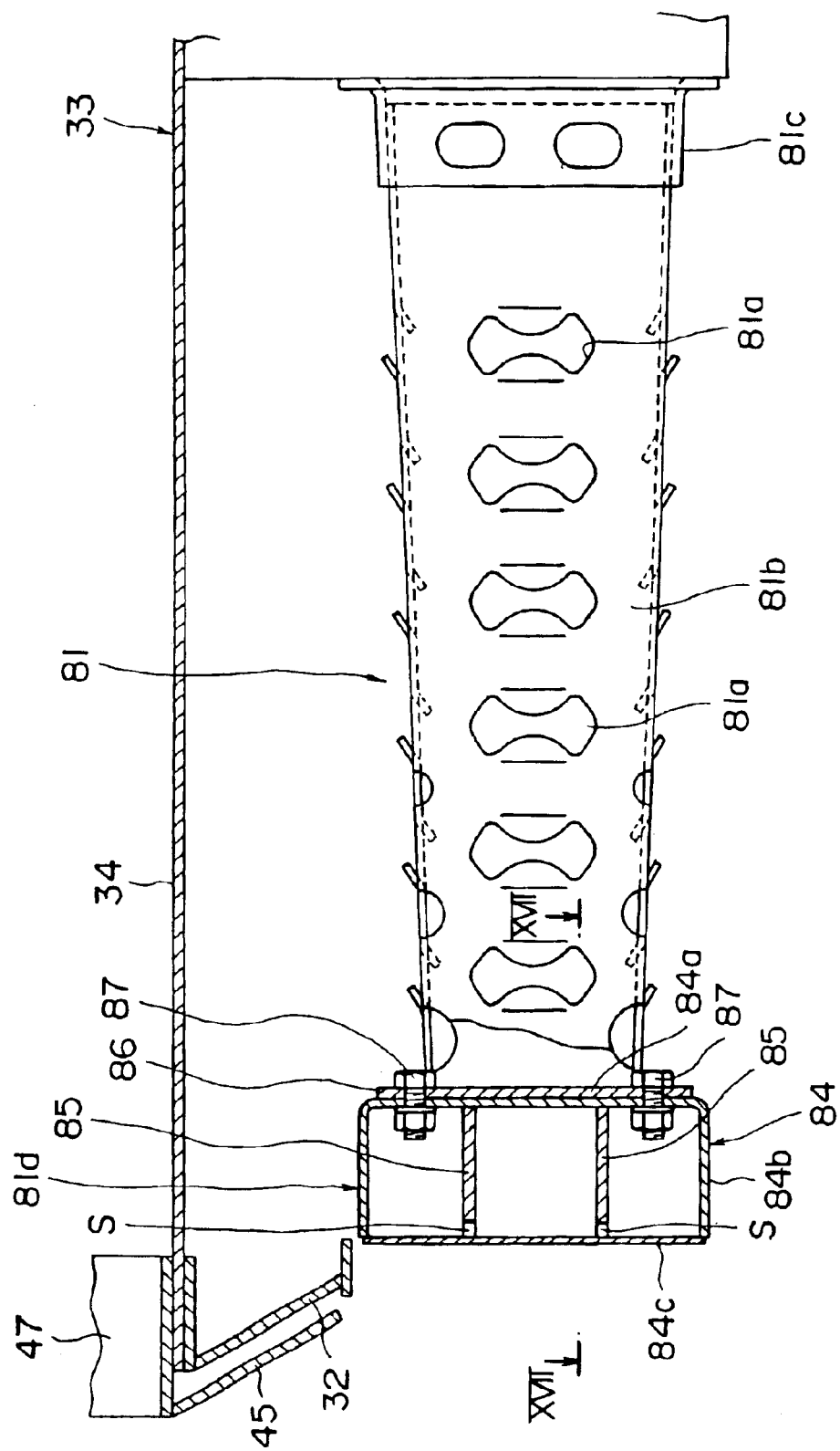
FIG. 16 is a sectional view taken on line XVI—XVI of FIG. 15.
Figure 17:
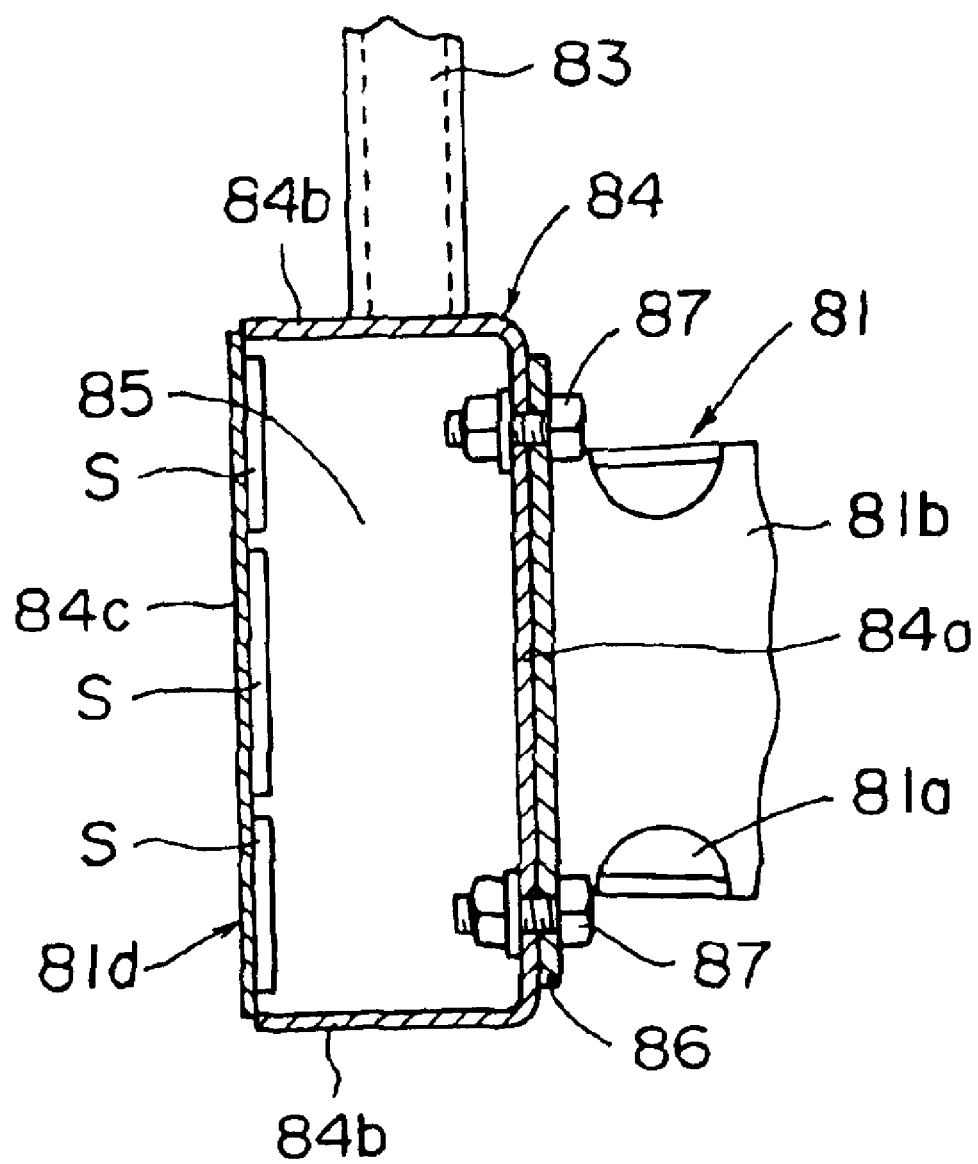
FIG. 17 is a sectional view taken on line XVII—XVII of FIG. 16.

In the present embodiment, as shown in FIGS. 15 to 17, left and right cushioning members 81 and 82 as a pair are disposed in a front end portion of an underframe 33. The respective cushioning members 81 and 82 are in practically the same configuration, and comprise bodies 81*b*, 82*b* in a square tubular shape and having a plurality of openings 81*a*, 82*a*, base end portions of the bodies 81*b*, 82*b* being bolted to a transverse beam by reinforcing brackets 81*c*, 82*c*, and box-shaped crash portions 81*d*, 82*d* attached to the front ends of the bodies 81*b*, 82*b*. The cushioning members 81, 82 have the crash portions 81*d*, 82*d* connected together by a connecting rod 83.

The crash portions 81*d*, 82*d* function as vertical restraining members for inhibiting vertical displacement when they collide with the crash portions of the cushioning members of the other party in a collision of the vehicles 11. The crash portion comprises a hollow box 84 in which side wall portions 84*b* are integrally formed on the four sides of a bottom 84*a*, a closure 84*c* is fixed to the front surface, and a plurality of (two in the present embodiment) horizontal engagement plates 85 are fixed at predetermined intervals. A reinforcing bracket 86 fixed to the front end portions of the bodies 81*b*, 82*b* of the cushioning members 81, 82 is tied to the bottom 84*a* of the box 84 of the crash portions 81*d*, 82*d* by a plurality of bolts 87. That is, when the crash portions 81*d*, 82*d* collide with the crash portions 81*d*, 82*d*, the closures 84*c* are deformed, and the engagement plates 85 engage each other, thereby inhibiting vertical displacement. In this condition, the mounting areas of the crash portions 81*d*, 82*d* are not deformed, while the bodies 81*b*, 82*b* buckle in the longitudinal direction and can absorb the impact force.

Thus, the strengths of the cushioning members 81, 82 and the crash portions 81*d*, 82*d* are set by adjusting their plate thicknesses. In this case, the connecting areas of the bodies 81*b*, 82*b* and the crash portions 81*d*, 82*d* are tied by the bolts 87 via the reinforcing brackets 86 to increase surface rigidity and achieve high strength. Out of necessity for inhibiting vertical displacement in a collision of the crash portions 81*d*, 82*d* with the crash portions 81*d*, 82*d*, the plate thickness of the engagement plates 85 is set so as to impart high strength to the engagement plates 85. Further, the plate thicknesses are set such that the side wall portion 84*b* of the box 84 is slightly weaker than the engagement plate 85, the bodies 81*b*, 82*b* of the cushioning members 81, 82 are weaker so as to buckle, and the closure 84*c* is the weakest so that the engagement plates 85 engage properly in the collision of the crash portions 81*d*, 82*d*. In addition, a predetermined gap S is provided between the engagement plate 85 and the closure 84*c*.

The thus configured rubber-tired new traffic vehicle 11 is operated smoothly and safely in an unmanned manner by the operation management system. However, if control instruments fail, various manual operations and manipulations by the driver are possible. In this case, the travel speed is limited to a low speed. In the case of such a manual operation or manipulation of the vehicle 11 by the driver, a collision accident to the vehicles 11 may occur owing to an erroneous operation or the like. Thus, as stated above, the front gable portion 13 and the rear gable portion 14, which serve as the crush zones, are formed ahead of and behind the passenger compartment 12, and the cushioning members 81, 82 are mounted below the front gable portion 13 and the rear gable portion 14. Furthermore, the vertical displacement of the cushioning members 81, 82 is inhibited so that the cushioning members 81, 82 are not displaced relative to the counterparts, but are buckled longitudinally and can absorb an impact force properly, when the vehicles 11 collide. For this purpose, the crash portions 81d, 82d attached to the front end portions of the cushioning members 81, 82 are constituted by fixing the plural horizontal engagement plates 85 at predetermined intervals within the box 84.

In detail, when the front gable portion 13 (rear gable portion 14) is crushed as the crush zone in a collision of the vehicles 11, the impact force in the collision enters the outer bumper 45 from the outer wall of FRP, is admitted into the front beams 47, 48 via the straight portions 47a, 48a, and is inputted to the crash portions 81d, 82d of the cushioning members 81, 82. Under these conditions, the central portions 32a, 45a (reinforcing material 46) of the bumpers 32, 45 are pushed, and the opposite side portions 32b, 45b are buckled in the longitudinal direction by the plural holes 32c, 45c. Also, the side reinforcing beam members 35 are buckled and bent into deformation by the plural holes 35c, as are the central reinforcing beam members 37 by the front beams 37b, and as are the connecting beams 50 by the plural holes 50a. Moreover, the cushioning members 81, 82 collide with the counterparts to start longitudinal buckling.

Figure 18:
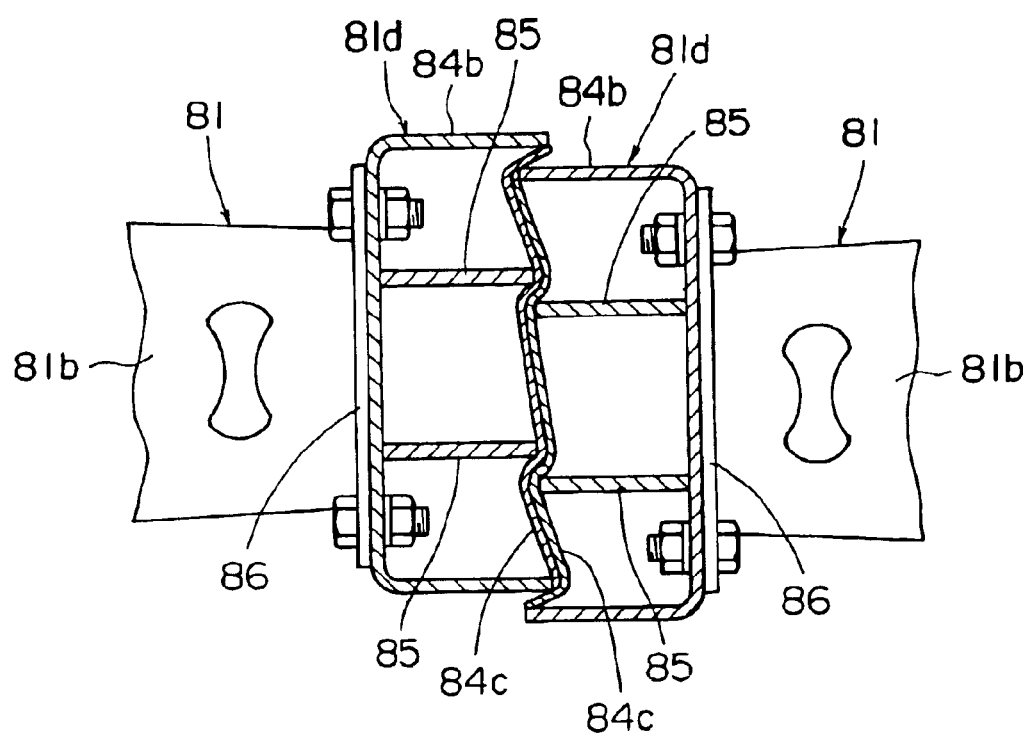
FIG. 18 is an essential sectional view showing a deformed state of a cushioning member at the time of a collision.

At this time, as shown in FIG. 18, the cushioning members 81, 82 of the vehicle 11 collide with the cushioning members 81, 82 of the other vehicle 11, and the engagement plates 85 engage each other, inhibiting vertical displacement. That is, when the crash portions 81d, 82d of the cushioning members 81, 82 come into a head-on collision with the counterparts, the engagement plates 85 with high strength push the closures 84c with low rigidity by the gaps S to deform them, with the result that the engagement plates 85 engage each other. This engagement of the engagement plates 85 inhibits vertical displacement of the crash portions 81d, 82d relative to the counterparts. Consequently, the mounting areas of the crash portions 81d, 82d given high strength by the reinforcing brackets 86 recede without sloping, whereupon the bodies 81b, 82b buckle properly in the longitudinal direction and can absorb the impact force reliably.

[Fifth Embodiment]

Figure 19:
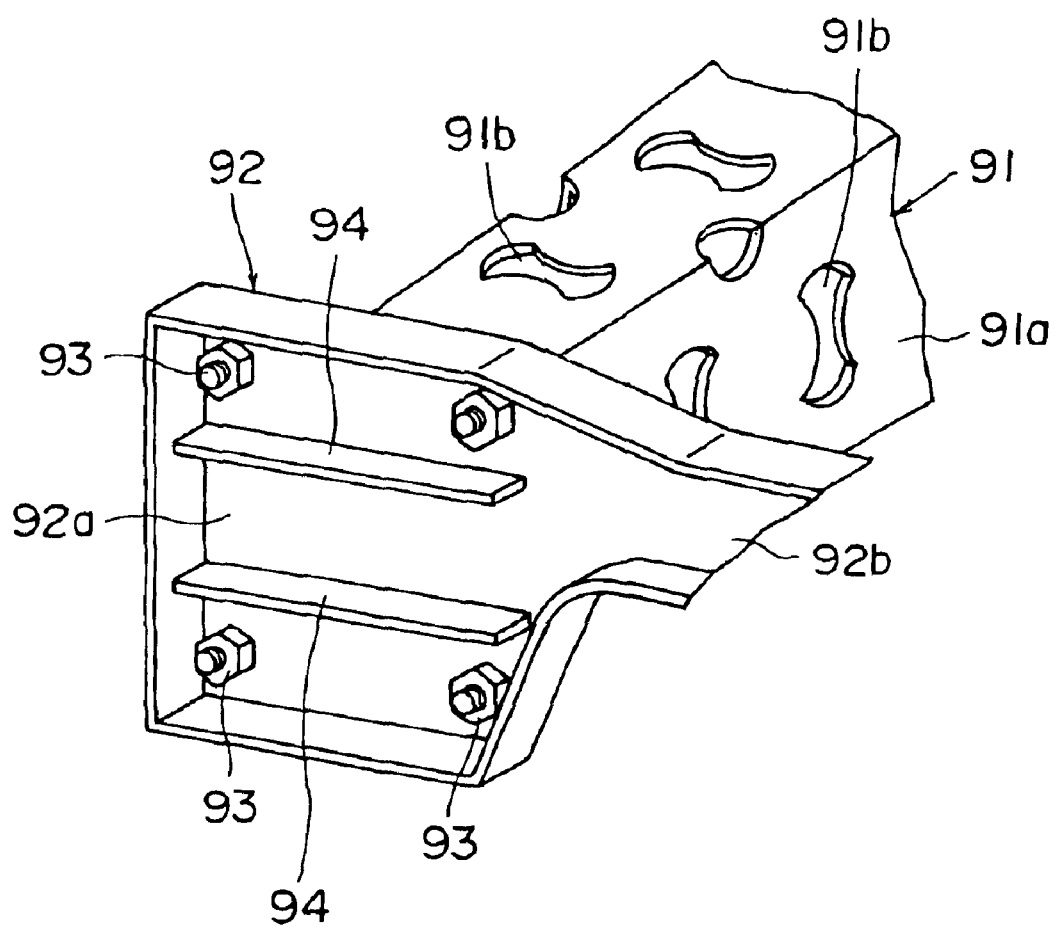
FIG. 19 is a perspective view of a cushioning member showing a vehicle body structure according to a fifth embodiment of the present invention.
Figure 20:
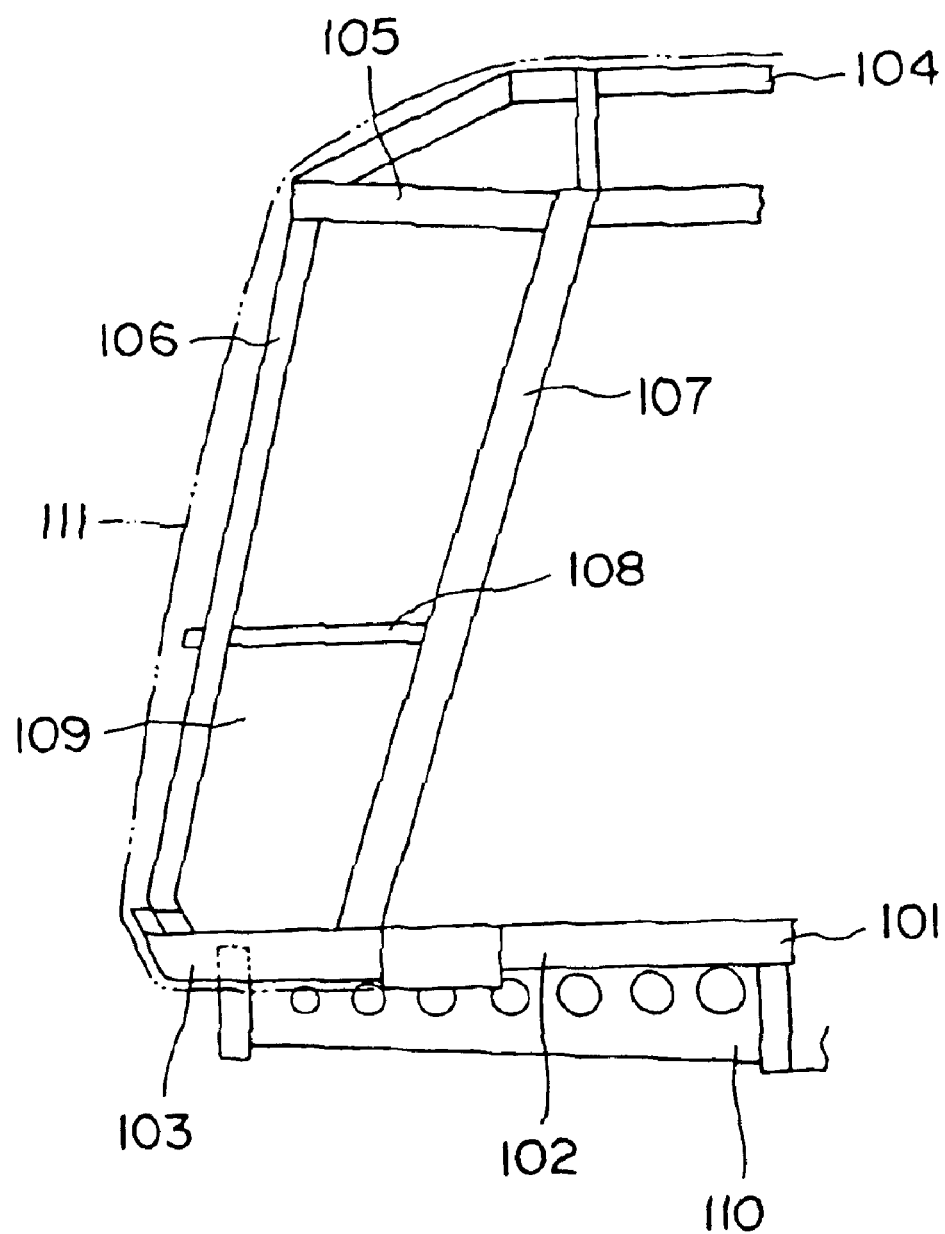
FIG. 20 (prior art) is a schematic view of a skeletal structure of a vehicle front end portion representing a conventional vehicle body structure.
Figure 21A:
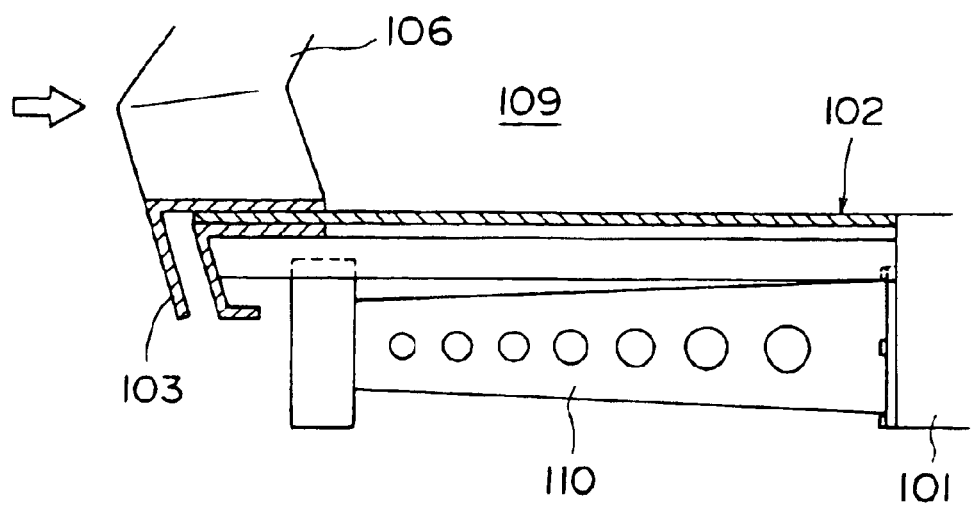
FIGS. 21(a) and 21(b) (prior art) are schematic views showing a deformed state of the conventional vehicle body structure at the time of a head-on collision.
Figure 21B:
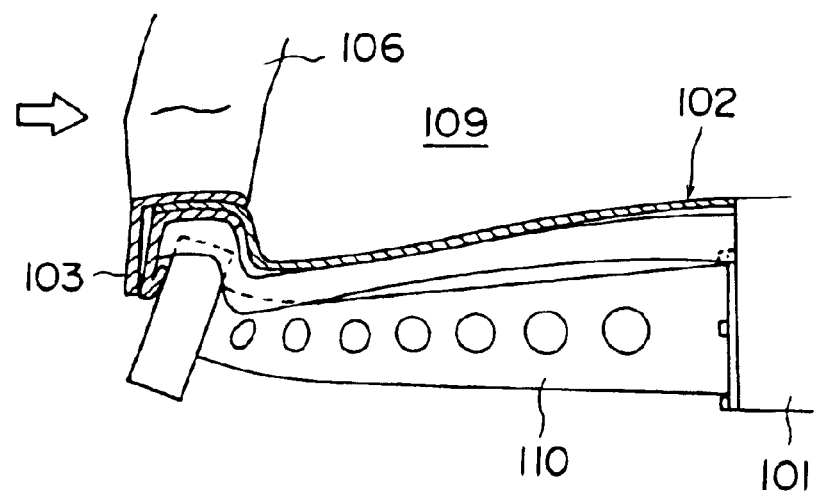

In the above embodiment, the cushioning members 81, 82 are constituted by fixing the crash portions 81d, 82d to the front ends of the bodies 81b, 82b, and connecting the crash portions 81d, 82d by the connecting rod 83. However, this structure is not limitative. In the present embodiment, as shown in FIG. 19, the crash portion of the cushioning member and the connecting rod are formed integrally. That is, a body 91a of a cushioning member 91 is in a square tubular shape, and has a plurality of openings 91b formed therein. A base end portion of the cushioning member 91 is fixed to a vehicle body (not shown). A connecting rod 92 is in a hollow shape in which a crash portion 92a and a connecting portion 92b (present on both sides of the vehicle body as a pair) are integrally formed. The back of the crash portion 92a is fixed to the front end of the cushioning member 91 by bolts 93, and two horizontal engagement plates 94 are fixed at a predetermined distance within the crash portion 92a. The connecting rod 92 is closed with a closure fixed to its front surface, but the closure is not shown for deep understanding of the interior.

When the connecting rods 92 of the cushioning members 91 collide with each other in a collision of the vehicles 11, the engagement plates 94 of the crash portions 92a engage each other. This engagement inhibits vertical displacement of the crash portions 92a relative to each other. Consequently, the mounting areas of the crash portions 92a recede without sloping, whereupon the body 91a buckles properly in the longitudinal direction and can absorb the impact force reliably. Since the crash portion 92a and the connection portion 92b integrally form the connecting rod 92, moreover, its manufacturing can be facilitated.

In the above embodiment, the cushioning members 81, 82, 91 are in a square tubular shape, but may be in a cylindrical shape. The crash portions 81d, 82d, 92a are hollow boxes, but may be plate materials with high rigidity. Furthermore, the vertical restraining members are the engagement plates 85, 94, but the plates may have depressions and projections, and their number is not limited to two. Nor are the numbers of the cushioning members 81, 82, 91 restricted to two, but their numbers may be one or three or more.

In each of the above-described embodiments, the vehicle body structure of the present invention has been described as being applied to the rubber-tired new traffic vehicle, but can be applied to general railway vehicles or automobile vehicles.

Industrial Applicability

As described above, the vehicle body structure according to the present invention achieves increased safety by reliably absorbing shock, which occurs when vehicles collide, without aggravating appearance quality or air resistance. The vehicle body structure is preferred mainly for use in the rubber-tired new traffic vehicle, but can be applied to general railway vehicles or automobile vehicles.

What is claimed is:

1. A vehicle body structure comprising a suspension system and a crush zone for absorbing an impact force in a collision on a front head side of a vehicle relative to a passenger compartment, the vehicle body structure comprising
at least one versicle beam within the crush zone, the vertical beam having a vertical length 2L that is set according to an amount of vertical displacement L during travel of the vehicle,
wherein the vertical displacement L is predetermined by tests or by calculations based on at least one of expected road conditions, a vehicle body rigidity of the vehicle body structure, and a performance of the suspension system.

2. The vehicle body structure of claim 1, characterized in that the vertical beam is located at a most forward position.

3. The vehicle body structure of claim 1, characterized in that a cushioning member located behind the vertical beam and adapted to buckle by the impact force, thereby relieving the impact force, is provided on one side in a vertical direction of the vertical beam, and a protrusion for secondary collision, which is exposed forward, is provided in a front end portion of the cushioning member.

4. The vehicle body structure of claim 1, characterized in that a cushioning member for relieving the impact force by being buckled by the impact force is provided behind the vertical beam, and a vertical restraining member for inhibiting vertical displacement, relative to a member to be collided with, in the collision is provided in a front end portion of the cushioning member.

5. The vehicle body structure of claim 1, characterized in that the vertical beam and an inclined beam, together, connect a roof frame and an underframe, and the inclined beam is inclined rearwardly from an upper portion of the vertical beam.

6. The vehicle body structure of claim 5, characterized in that a plurality of the vertical beams are provided in a width direction of the vehicle.

7. The vehicle body structure of claim 1, characterized in that the vertical beam and an inclined beam, together connect a roof frame and an underframe, a bumper is connected to the underframe, and the bumper has a central portion protruding forwardly of the vehicle and has buckling strength changing means provided in opposite side portions.

8. The vehicle body structure of claim 7, characterized in that the opposite side portions of the bumper are weakened relative to the central portion by the buckling strength changing means.

9. The vehicle body structure of claim 8, characterized in that a reinforcing member is provided in the central portion of the bumper.

10. The vehicle body structure of any one of claims 1 to 9, characterized in that the vehicle is constituted by mounting a plurality of running wheels to a box-shaped vehicle body having the crush zones provided ahead of and behind the passenger compartment, and the vehicle rotationally drives the running wheels while being supplied with an electric power, whereby the vehicle can travel along dedicated tracks.

11. A vehicle body structure comprising a crush zone for absorbing an impact force in a collision provided on a front head side of a vehicle relative to a passenger compartment, and a straight portion extending along a vertical direction formed in a front portion of a vertical beam as a constituent member constituting the crush zone, characterized in that the vertical beam connects a roof frame and an underframe, a bumper is connected to the underframe, and the bumper has a central portion protruding forwardly of the vehicle and has buckling strength changing means provided in opposite side portions, characterized in that the opposite side portions of the bumper are weakened relative to the central portion by the buckling strength changing means, and characterized in that the buckling strength changing means comprises holes formed in the bumper.

12. A vehicle body structure comprising a crush zone for absorbing an impact force in a collision provided on a front head side of a vehicle relative to a passenger compartment, and a straight portion extending along a vertical direction formed in a front portion of a vertical beam as a constituent member constituting the crush zone.

characterized in that a cushioning member located behind the constituent member and adapted to buckle by the impact force, thereby relieving the impact force, is provided on one side in a vertical direction of the straight portion, and an auxiliary member is provided for bending the constituent member away from the cushioning member when the impact force is inputted.

13. The vehicle body structure of claim 12, characterized in that the constituent member includes a bumper connected to a lower end portion of the vertical beam, and a beam member constructed between the bumper and a vehicle body, and a front portion of the beam member is bent toward the cushioning member to constitute the auxiliary member.

14. The vehicle body structure of claim 12, characterized in that the constituent member includes a bumper connected to a lower end portion of the vertical beam, a reinforcing member fixed behind the bumper, and a beam member constructed between the bumper and the reinforcing member, and a front portion of the beam member is curved toward the cushioning member to constitute the auxiliary member.

15. The vehicle body structure of claim 12, characterized in that the constituent member is a bumper connected to a lower end portion of the vertical beam, continued from the straight portion, and inclined rearward, and the bumper covers at least part of the cushioning member.

16. A vehicle body structure comprising a crush zone for absorbing an impact force in a collision provided on a front head side of a vehicle relative to a passenger compartment, and a straight portion extending along a vertical direction formed on a front portion of a vertical beam as a constituent member constituting the crush zone, characterized in that a plurality of cushioning members for relieving the impact force by being buckled by the impact force are arranged side by side on right and left sides of the vehicle behind the straight portion, and front end portions of the cushioning members are connected by a connecting member.

17. The vehicle body structure of claim 16, characterized in that the cushioning member includes a buckling portion extending forward from a base end portion attached to a vehicle body, and a crash portion attached to a front end portion of the buckling portion, reinforcing means is provided in a mounting area of the vehicle body and the buckling portion, and a reinforcing member is provided in a connecting area of the buckling portion and the crash portion.

18. A vehicle body structure comprising a crush zone for absorbing an impact force in a collision provided on a front head side of a vehicle relative to a passenger compartment, and a straight portion extending a vertical direction formed in a front portion of a vertical beam as a constituent member constituting the crush zone, characterized in that a cushioning member for relieving the impact force by being buckled by the impact force is provided behind the straight portion, and a vertical restraining member for inhibiting vertical displacement, relative to a member to be collided with, in the collision is provided in a front end portion of the cushioning member, and characterized in that the vertical restraining member is constituted by fixing a plurality of horizontal engagement plates at predetermined intervals in a hollow box attached to the front end portion of the cushioning member.

19. The vehicle body structure of claim 18, characterized in that the plurality of engagement plates are fixed to a rear surface of the hollow box, and predetermined gaps are formed between a front surface of the hollow box and the plurality of engagement plates.

* * * * *

UNITED STATES PATENT AND TRADEMARK OFFICE
CERTIFICATE OF CORRECTION

PATENT NO. : 6,799,794 B2
DATED : October 5, 2004
INVENTOR(S) : Mochidome et al.

It is certified that error appears in the above-identified patent and that said Letters Patent is hereby corrected as shown below:

<u>Column 20,</u>
After line 56, the following claims should be added:

20. The vehicle body structure of claim 11, characterized in that the vehicle in constituted by mounting a plurality of running wheels to a box-shaped vehicle body having the crush zones provided ahead of and behind the passenger compartment, and the vehicle rotationally drives the running wheels while being supplied with an electric power, whereby the vehicle can travel along dedicated tracks.

21. The vehicle body structure of any one of claims 12 to 15, characterized in that the vehicle is constituted by mounting a plurality of running wheels to a box-shaped vehicle body having the crush zones provided ahead of and behind the passenger compartment, and the vehicle rotationally drives the running wheels while being supplied with an electric power, whereby the vehicle can travel along dedicated tracks.

22. The vehicle body structure of any one of claims 16 to 17, characterized in that the vehicle is constituted by mounting a plurality of running wheels to a box-shaped vehicle body having the crush zones provided ahead of and behind the passenger compartment, and the vehicle rotationally drives the running wheels while being supplied with an electric power, whereby the vehicle can travel along dedicated tracks.

23. The vehicle body structure of any one of claims 18 to 19, characterized in that the vehicle is constituted by mounting a plurality of running wheels to a box-shaped vehicle body having the crush zones provided ahead of and behind the passenger compartment, and the vehicle rotationally drives the running wheels while being supplied with an electric power, whereby the vehicle can travel along dedicated tracks.

Signed and Sealed this

Nineteenth Day of April, 2005

JON W. DUDAS
*Director of the United States Patent and Trademark Office*